(12) United States Patent  (10) Patent No.: US 8,544,061 B2
Chen  (45) Date of Patent: Sep. 24, 2013

(54) OBJECT MODEL FOR DOMAIN-BASED CONTENT MOBILITY

(75) Inventor: Kuang M. Chen, San Diego, CA (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/344,023

(22) Filed: Jan. 5, 2012

(65) Prior Publication Data

US 2012/0180109 A1  Jul. 12, 2012

Related U.S. Application Data

(60) Provisional application No. 61/430,202, filed on Jan. 6, 2011.

(51) Int. Cl.
*H04L 9/32* (2006.01)

(52) U.S. Cl.
USPC ..................................... 726/2; 726/3; 726/26

(58) Field of Classification Search
USPC ..................... 726/2–7, 27–30; 713/150, 163, 713/167, 168–170; 380/200–202
See application file for complete search history.

(56) References Cited

U.S. PATENT DOCUMENTS

| 7,231,516 | B1 * | 6/2007 | Sparrell et al. | 713/156 |
| 7,770,229 | B2 * | 8/2010 | Upendran | 726/30 |
| 2012/0117587 | A1 * | 5/2012 | Pedlow et al. | 725/25 |

* cited by examiner

*Primary Examiner* — Hosuk Song

(57) ABSTRACT

In embodiments of an object model for domain-based content mobility, a client object model architecture (146) is configured for scalable and adaptive implementation to interface a mobile client device (128) with a media server (126) for wireless, secure download of media content (136) to the mobile client device. The client object model architecture can be implemented for domain-based control of a proxy application (144) that instantiates a media player (142) on the mobile client device, and interfaces with the media server that communicates the media content to the mobile client device. The client object model architecture also controls domain discovery of the media server, domain-based registration of the mobile client device with the media server, authentication of the mobile client device to the media server, and the secure download of the media content from the media server to the mobile client device.

22 Claims, 16 Drawing Sheets

OBJECT MODEL FOR DOMAIN-BASED CONTENT MOBILITY

RELATED APPLICATIONS

This application claims priority to U.S. Provisional Application Ser. No. 61/430,202 filed Jan. 6, 2011, entitled "An Object Model for Domain-based Content Mobility Solution", the disclosure of which is incorporated by reference herein in its entirety.

BACKGROUND

The traditional notion of watching television at home has evolved into many different forms of viewing television content, on many different devices. For example, users can watch television content, such as live television, recorded television, and time-shifted programs and movies, on various devices, such as televisions, display devices, entertainment devices, computers, and even mobile devices, such as tablets and mobile phones. Media content that is streamed or otherwise communicated to a client device, such as media content wirelessly communicated to a mobile phone, needs to be maintained as secure and encrypted. However, current mobile phones are not typically implemented to decrypt the media content that is encrypted by some security systems for playback as a progressive download, and further, current mobile phones are not able to render high-definition media content.

The digital media content can be transcoded and then streamed or otherwise communicated to a client device for audio/video playback of the media content on the client device. For example, media content, such as streaming live television or recorded media content, can be communicated to a mobile phone for playback and display on the mobile phone. However, there are many inoperability issues pertaining to streaming digital media content to a mobile client device, such as content listing, accessing content metadata, copyrights verification, content protection, media streaming and download, content storage and management, device authentication, and media content playback.

Some conventional technologies that attempt to address these inoperability issues either do not specifically resolve the domain-based content mobility problems, or address them in such a way as to limit the choice of solutions. For example, one such solution is DLNA (Digital Living Network Alliance), which attempts to address media content sharing in a home environment, but has a goal to achieve content interoperability by a user having to select a set of protocol suites.

BRIEF DESCRIPTION OF THE DRAWINGS

Embodiments of an object model for domain-based content mobility are described with reference to the following Figures. The same numbers may be used throughout to reference like features and components that are shown in the Figures.

DETAILED DESCRIPTION

In embodiments, an object model for domain-based content mobility can be implemented as a client object model architecture, such as a software development kit (SDK) that is scalable and adaptive to interface a mobile client device configured for wireless communication with a media server. For example, a client device, such as a mobile phone, tablet device, or computer can implement the client object model architecture for domain-based control of a proxy application that instantiates a media player on the client device, and interfaces with the media server that communicates media content to the client device. The client object model architecture also controls domain discovery of the media server, domain-based registration of the client device with the media server, authentication of the client device to the media server, and the secure download of the media content from the media server to the client device.

In embodiments, the object model for domain-based content mobility is an abstraction of a set of objects that enable developers to write domain-based content mobility applications, such as for mobile client devices. The client object model architecture includes a set of classes, the associated methods, and the relationships between the classes. The object model provides an interface to address the inoperability issues described above, and allows different technology solutions to be implemented with the object model. Accordingly, the client object model architecture is flexible (not limited to a certain set of technologies) and extensible (as the object model itself can be expanded).

The client object model architecture provides for the design of a client device SDK interface layer, through which functionality can be implemented to include any one or combination of domain discovery, device registration and control, digital rights management (DRM), media server content list and metadata acquisition, content streaming, content download and protection, secure content playback, download queue management, local content access and management, and transcoding queue alteration.

While features and concepts of an object model for domain-based content mobility can be implemented in any number of different devices, systems, networks, and/or configurations, embodiments of an object model for domain-based content mobility are described in the context of the following example devices, systems, and methods.

Figure 1:
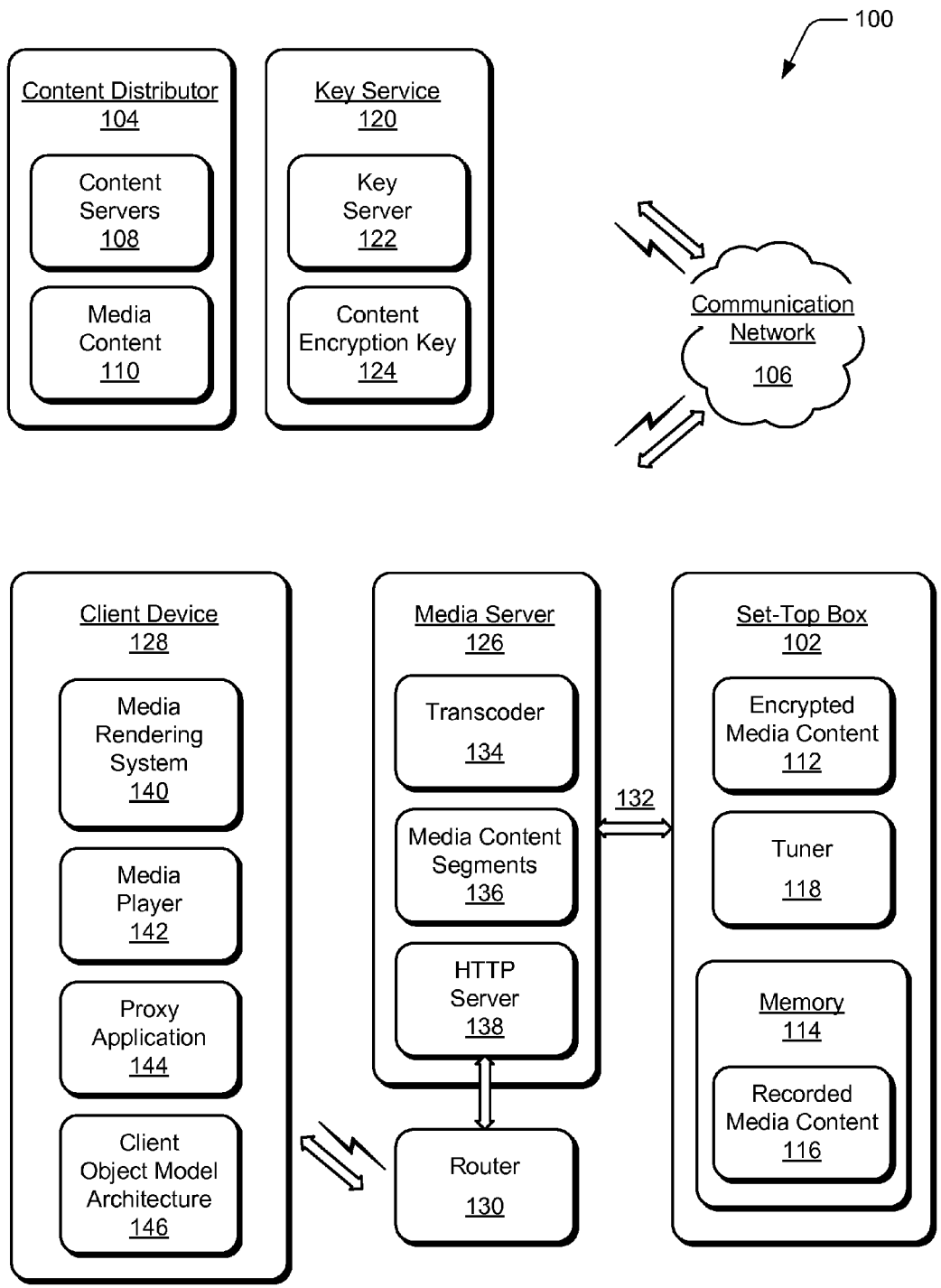
FIG. 1 illustrates an example system in which embodiments of an object model for domain-based content mobility can be implemented.

FIG. 1 illustrates an example system 100 in which embodiments of an object model for domain-based content mobility can be implemented. The example system 100 includes a television set-top box 102, such as cable television box, digital video recorder (DVR), or any other type of television client device that receives media content from a headend via a service network. For example, a content distributor 104 and/or other media content sources deliver media content and data to any number of various devices via a communication network 106, such as to the television set-top box in a home or business environment.

The content distributor 104 includes content servers 108 to distribute media content 110 to the set-top box 102, such as live television and/or recorded on-demand video content that is distributed via a coaxial cable system or IP-based system. The set-top box 102 receives the media content from the content distributor as encrypted media content 112, which can include any type of audio, video, and/or image data in the form of television programming, movies, on-demand video, interactive games, advertisements, and the like. In a DVR implementation, the set-top box can record the encrypted media content with memory 114 that maintains the recorded media content 116. In this example, the set-top box 102 also includes a tuner 118 that tunes to a television channel frequency over which the media content is delivered. In addition, the set-top box can be implemented with various components, such as processor and memory devices, as well as with any combination of differing components as further described with reference to the example electronic device shown in FIG. 17.

The example system also includes a key service 120, such as any key encryption service and/or key service provider, that implements a key server 122 to distribute a content encryption key 124 (CEK) for secure delivery and communication of encrypted media content. In implementations, the encrypted media content is not dependent on a particular key server, and different key servers or services may be utilized for the secure delivery and communication of media content between devices, services, and/or components in the example system 100. The content distributor, key service, and/or the respective servers can be implemented with various components, such as processor and memory devices, as well as with any combination of differing components as further described with reference to the example electronic device shown in FIG. 17. For example, the content distributor and the key service include storage media, such as any type of memory and/or suitable electronic data storage, to store or otherwise maintain the media content and other data.

Any of the services, devices, and servers can communicate via the communication network 106, which can be implemented to include a wired and/or a wireless network. The communication network can also be implemented using any type of network topology and/or communication protocol, and can be represented or otherwise implemented as a combination of two or more networks, to include IP-based networks and/or the Internet. The communication network may also include mobile operator networks that are managed by a mobile network operator and/or other network operators, such as a communication service provider, cell-phone provider, and/or Internet service provider.

The example system 100 also includes a media server 126 that is implemented to communicate media content, such as recorded media content, to a client device 128 via a router 130 implemented for wired and/or wireless communication. The media server may also be referred to herein as the mover or media streamer. The media server 126 receives the encrypted media content 112 and/or the recorded media content 116 from the set-top box 102 via an Ethernet connection 132. The media server is implemented to communicate and sync with the set-top box (and/or DVR) automatically, and provides a proprietary interface for media content look-up, transport, and protection. The media server decrypts the encrypted media content that is received from the set-top box via standard digital transmission content protection (DTCP), and then transcodes the decrypted media content. The media server can also communicate with the key service 120 via the communication network 106 and receives a content encryption key 124 (CEK). The media server 126 can then utilize the content encryption key to re-encrypt the formatted (e.g., transcoded) media content.

The media server 126 includes a transcoder 134 to format the decrypted media content for distribution to the client device 128 as media content segments 136 with an HTTP server 138 via the router 130. For example, the media server formats high-definition media content received from the set-top box 102, such as MP4 media content, to VGA formatted media content, or to an MP2 format. The media server 126 is implemented to then re-encrypt the formatted media content with the encryption key for communication to the client device via the router 130, so that the media content remains secure when communicated over WiFi™ or Ethernet to the client device.

The media server 126 can be implemented with various components, such as a processor and memory devices, as well as with any combination of differing components as further described with reference to the example electronic device shown in FIG. 17. For example, the media server 126 can include memory that is implemented to buffer the media content segments 136 that are transcoded and maintained for delivery to the client device 128. Further, although shown as an independent component or device, the media server 126 may be implemented as an integrated component or device of the set-top box 102. Alternatively, the media server 126 may be implemented as a network-based media server (e.g., in the cloud) to decrypt the encrypted media content, transcode the decrypted media content, and re-encrypt the formatted media content for distribution to the client device as encrypted, formatted media content.

The client device 128 may be implemented as any one or combination of a communication, computer, media playback, gaming, entertainment, and/or electronic device, such as a mobile phone or tablet device that can be configured as a television client device to receive and playback media content. The client device can be implemented with various components, such as processor and memory devices, as well as with any combination of differing components as further described with reference to the example electronic device shown in FIG. 17. For example, the client device includes a media rendering system 140 to playback media content for viewing on an integrated display device.

The client device can also include various client applications, such as a media player 142 that is implemented to manage the media content playback, as well as a proxy application 144 that can be implemented as computer-executable instructions, such as a software application, and executed by one or more processors on the client device. In embodiments, the proxy application 144 is implemented to receive the media content that is formatted and encrypted from the media server 126, such as being received wirelessly via the router 130. The proxy application can initiate storing the encrypted, formatted media content in data storage on the client device 128. The proxy application is also implemented to request the content encryption key 124, receive the encryption key from the key server 122, and store the encryption key in the data storage on the client device. The proxy application may also receive encryption key request parameters from the media server 126, and utilize the encryption key request parameters to request the content encryption key 124 from the key service 120.

When the proxy application 144 receives a request for the media content from the media player, the proxy application can retrieve the encryption key and the encrypted media content from the data storage on the client device. The proxy application 144 then decrypts segments of the encrypted media content with the encryption key, and communicates the decrypted media content segments to the media player 142 for playback on the client device. Accordingly, the media player operates as if performing a progressive download against clear content and is totally agnostic of the media content being received and/or stored as encrypted media content and then decrypted by the proxy application. For example, the media content can be decrypted by the proxy application for playback by the media player 142 as segments of the media content are received for secure progressive download. Alternatively or in addition, the media content can be downloaded and stored locally, and later decrypted and played back when the client device is no longer communicatively linked in the local network, such as when a user is traveling and wanting to display the media content (e.g., watch a recorded movie or television program).

In embodiments, the proxy application 144 instantiates the media player 142 with an obfuscated URL pointing to itself, and the media player can determine the proxy application from the URL. The obfuscated URL can be generated randomly with a different value for each progressive download and/or local playback session, and the URL points back to the proxy application so that the media player knows where to request the media content from for playback. On the client device 128, the proxy application 144 executes first, and when a user of the client device initiates a request for media content playback, the proxy application generates the obfuscated URL and instantiates the media player 142. The media player can then communicate with the proxy application via an HTTP request and HTTP response.

The client device also implements a client object model architecture 146 to implement the various embodiments of an object model for domain-based content mobility described herein. The client object model architecture can be implemented as part of a software stack on the client device, such as the software stack further described with reference to FIG. 2. The client object model architecture 146 enables the client device to list and describe media server content; support progressive download of the media content; protect the media content transport and storage; enforce digital rights management (DRM) rules; support content playback with the media player; enforce domain control; and/or personalize and register user devices. Additionally, the client device can be authenticated via certificates, implement domain control (e.g., the number of devices allowed to register in the domain is enforced), implement domain registration, domain de-registration, and/or domain re-registration.

In embodiments, functionality of the client device 128 with the client object model architecture 146 includes implementation of the proxy application 144 that instantiates the media player 142 on the client device; domain discovery of the media server 126; domain-based registration of the client device with the media server; authentication of the client device to the media server; domain control for secure download of media content from the media server to the client device; digital rights management (DRM) of the secure download of the media content to the client device; acquisition of a media content list and metadata that corresponds to the media content; transcoding the media content for download to the client device; content streaming of the media content to the client device; download queue management of the media content that is queued for download to the client device; and playback of the media content on the client device.

The discovery of a remote content source (e.g., the media server 126 or a network-based content source) is controlled by the domain registration and failure to register the client device 128 will result in failure to discover the remote content source, as well as media content consumption will not be allowed if registration fails. The client device 128 can discover a server name of the media server 126 that can be used to resolve an IP address for the media server. The media server supports Multicast DNS (mDNS) for the name discovery and IP address resolution mechanism. The mDNS protocol allows the client device to discover the media server by obtaining its fully-qualified name and IP address. The client device can first multicast a query looking for the media server and then the media server's mDNS server responds by providing the fully qualified name (FQN) and IP address. The client device can then build its name resolution table and, when the media server FQN is used in an HTTP URI, the message will be sent to the media server correctly.

Figure 2:
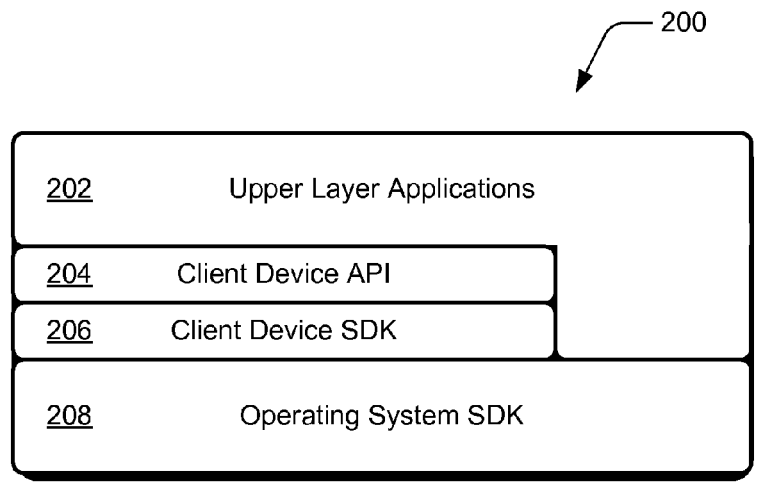
FIG. 2 illustrates an example software stack for a client device in which embodiments of an object model for domain-based content mobility can be implemented.

FIG. 2 illustrates an example software stack 200 implemented in the client device 128 as described with reference to FIG. 1. In this example, the software stack includes upper layer applications 202 of the client device, a client device API set 204, a client device SDK 206 (software development kit), and an operating system SDK 208, such as for iOS or ANDROID operating systems. In embodiments, the client device SDK 206 is an implementation of the client object model architecture 146 on the client device 128 for object model domain-based content mobility.

Figure 3:
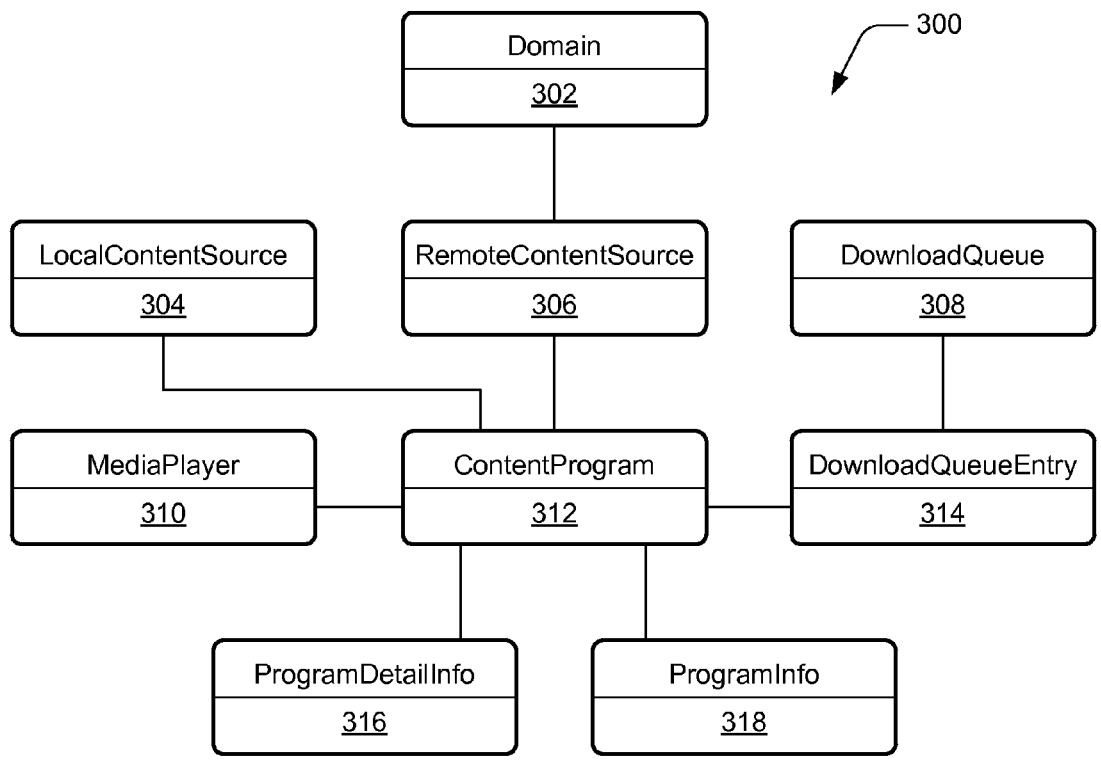
FIG. 3 illustrates an example client object model architecture in accordance with one or more embodiments.

FIG. 3 illustrates an example client object model architecture 300 (e.g., a client device API object model), such as the client object model architecture 146 that is implemented on the client device 128 described with reference to FIG. 1. The client object model architecture 300 includes a set of classes, the associated methods, and the relationships between the classes, as configured by the client device SDK 206 described with reference to FIG. 2. A domain controller can be instantiated from the domain class 302 for overall control of the object model and to control the domain discovery of the media server 126, the domain-based registration of the client device with the media server, and the authentication of the client device to the media server so that the client device is trusted to receive encrypted, formatted media content from the media server.

In addition to the domain class 302, the object model 300 includes a local content source class 304; a remote content source class 306; a download queue class 308; a media player class 310 (e.g., such as to instantiate the media player 142 in the client device 128); a content program class 312; a download queue entry class 314; a program detail info class 316; and a program info class 318. The local content source class 304 includes functionality to control the media content that is already securely downloaded and maintained on the client device 128. The local content source class also controls displaying metadata that corresponds to the media content and deletion of the metadata.

The remote content source class 306 represents the media server 126 and includes functionality to interface with the media server. The remote content source class also provides methods to retrieve a remote content list and download remote media content, such as remote media content that can be streamed to the client device. Remote media content usage control can be enforced by the IPRM system according to its copyrights. A remote content list includes the state of all the different remote media content and is sorted by the content state. An update to the remote content list is notified via a multicast domain name service (mDNS) message, and can provide attributes of the media content, such as the ID, descriptions, parental control information, playback duration, ratings, the content file URL(s), the icon URL(s), protection type, series name, and the episode name.

The download queue entry class 314 includes functionality to manage the media content that is scheduled to download to the client device, and the download queue class 308 provides methods to manage download queue entry. Before media content is fully downloaded from the media server to the client device, the media content is an entry in a download queue. The download queue class 308 can manage a deletion from the download queue, a stop and restart of a download, a change of the media content download order, a report of media content download progress. Further, downloaded media content is protected by the IPRM system, can be stored persistently on the client device, and the media content is playback ready (e.g., the audio/video data of the media content can be rendered with or without connection to the remote content source). The metadata that corresponds to the media content can also be stored persistently on the client device.

The media player class 310 represents the media player 142 that is instantiated by the proxy application 144, and includes functionality to control playback of recorded media content and/or streaming media content on the client device. The playback of the recorded media content, and playback of the streaming media content, are both different instantiations of the media player class. The content program class 312 represents one of local recorded media content (e.g., the local content source class 304) or remote streaming media content (e.g., the remote content source 306). The program detail information class 316 includes metadata corresponding to the media content, and the program information class 318 includes information about an individual program.

Figure 4:
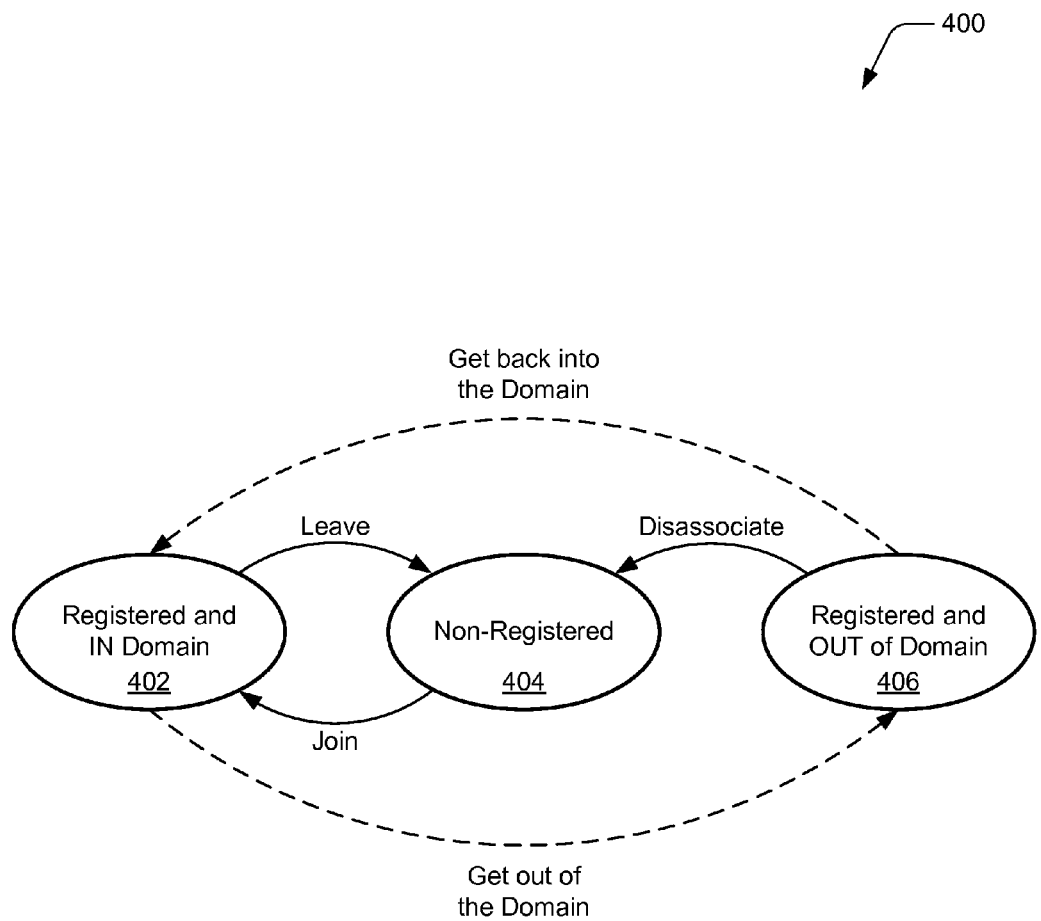
FIG. 4 illustrates an example of client device registration state transitions in accordance with one or more embodiments of an object model for domain-based content mobility.

FIG. 4 illustrates an example state diagram 400 of client device registration state transitions, and registration to the domain object. As described above, client device registration is controlled by a domain controller that is instantiated from the domain class 302 of the client object model architecture. The example state diagram 400 includes a 'registered and in domain' state 402 that indicates the client device is registered to the domain; a 'non-registered' state 404 that indicates the client device is not registered to the domain; and a 'registered and out of domain' state 406 that indicates the client device is registered in the domain, but is out of communication range. For example, the client device may be out of range to communicate in the domain via router 130 of the system described with reference to FIG. 1. The example state diagram 400 also illustrates programmable transitions to leave, join, and disassociate, as well as non-programmable transitions to get back into the domain, or get out of the domain.

Example method 500 is described with reference to FIG. 5 in accordance with one or more embodiments of an object model for domain-based content mobility. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 5:
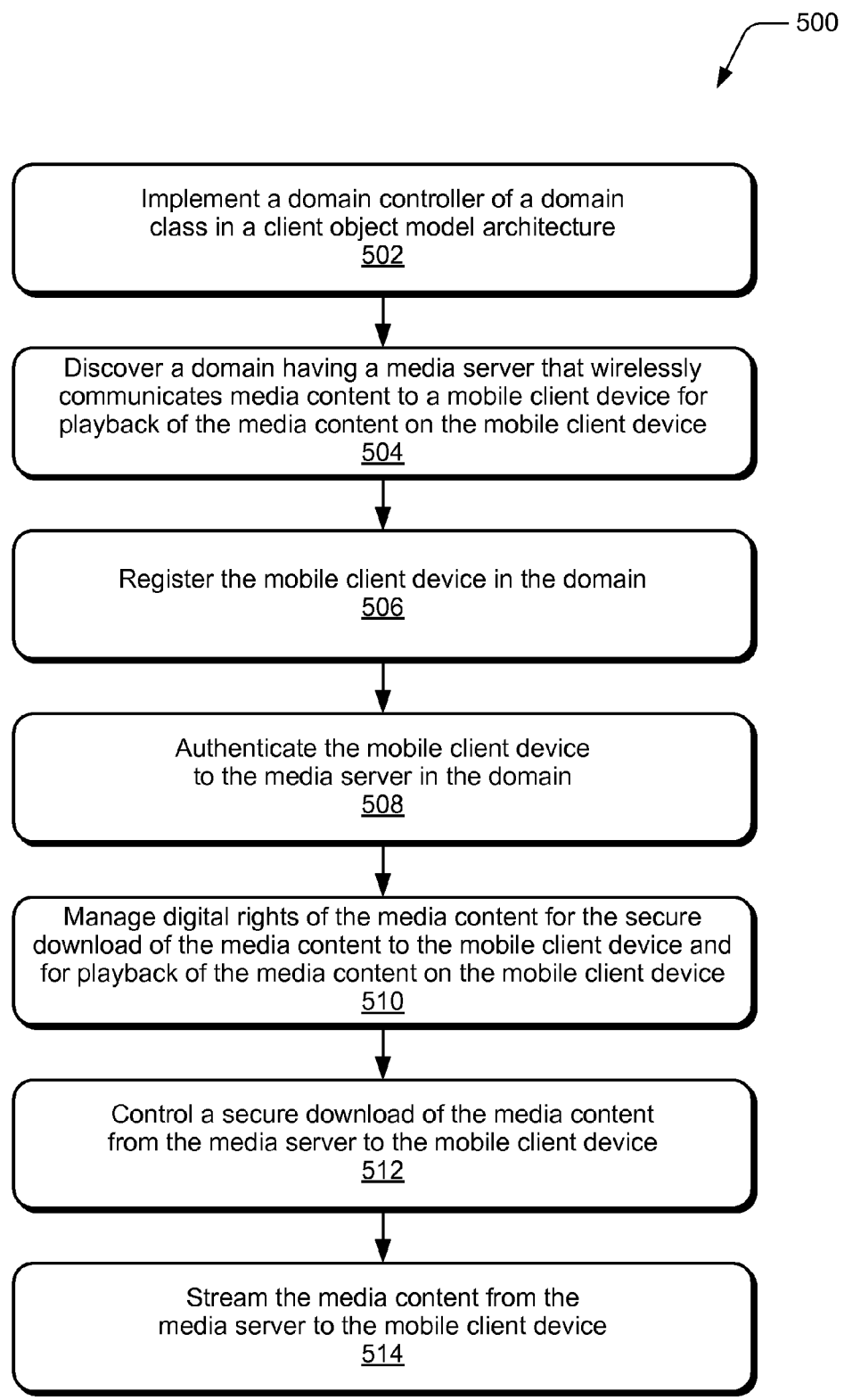
FIG. 5 illustrates example method(s) of an object model for domain-based content mobility in accordance with one or more embodiments.

FIG. 5 illustrates example method(s) 500 of an object model for domain-based content mobility, and is generally described with reference to embodiments of a domain controller instantiated from the domain class. The order in which the method blocks are described are not intended to be construed as a limitation, and any number or combination of the described method blocks can be combined in any order to implement a method, or an alternate method.

At block 502, a domain controller is implemented from a domain class in a client object model architecture. For example, the client object model architecture 300 (FIG. 3) includes a domain controller that is instantiated from the domain class 302. At block 504, a domain is discovered that has a media server, which wirelessly communicates media content to a mobile client device for playback of the media content on the mobile client device. For example, the domain controller (e.g., of the domain class 302) in the client object model architecture 300 discovers the domain that includes the media server 126, which wirelessly communicates media content to the client device 128 via the router 130 for playback of the media content on the mobile client device.

At block 506, the mobile client device is registered in the domain. For example, the domain controller (e.g., of the domain class 302) in the client object model architecture 300 controls domain registration, and registers the client device 128 in the domain. At block 508, the mobile client device is authenticated to the media server in the domain. For example, the domain controller (e.g., of the domain class 302) in the client object model architecture 300 controls client device authentication to receive encrypted media content from the media server 126, and the domain controller authenticates the client device 128 to the media server 126.

At block 510, digital rights of the media content are managed for the secure download of the media content to the mobile client device and for playback of the media content on the mobile client device. For example, the domain controller (e.g., of the domain class 302) in the client object model architecture 300 manages the digital rights to securely download the encrypted media content from the media server 126 to the client device 128 via the router 130, such as over wireless communication to a mobile client device.

At block 512, a secure download of the media content from the media server to the mobile client device is controlled and, at block 514, the media content is streamed from the media server to the mobile client device. For example, classes of the client object model architecture 300 can be implemented to control and manage the secure download of streaming media content from the media server 126 to the client device 128, where the media content is encrypted for the secure download to the client device and then decrypted at the client device for playback by the media player.

FIGS. 6-16 illustrate respective API object model communication sequence diagrams between the components, devices, and entities in a client object model domain system in accordance with one or more embodiments of an object model for domain-based content mobility. The client object model architecture 300 described with reference to FIG. 3 includes the set of classes, the associated methods, and shows the relationships between the classes. The client object model includes the set of APIs to implement the object model, and the object model communication sequence diagrams shown in FIGS. 6-16 illustrate the object model APIs. Further, a Representational State Transfer (REST) software architecture is described below as the REST API specification that includes the API definitions of the object model classes that are described with reference to the client object model architecture 300 shown in FIG. 3.

Figure 6:
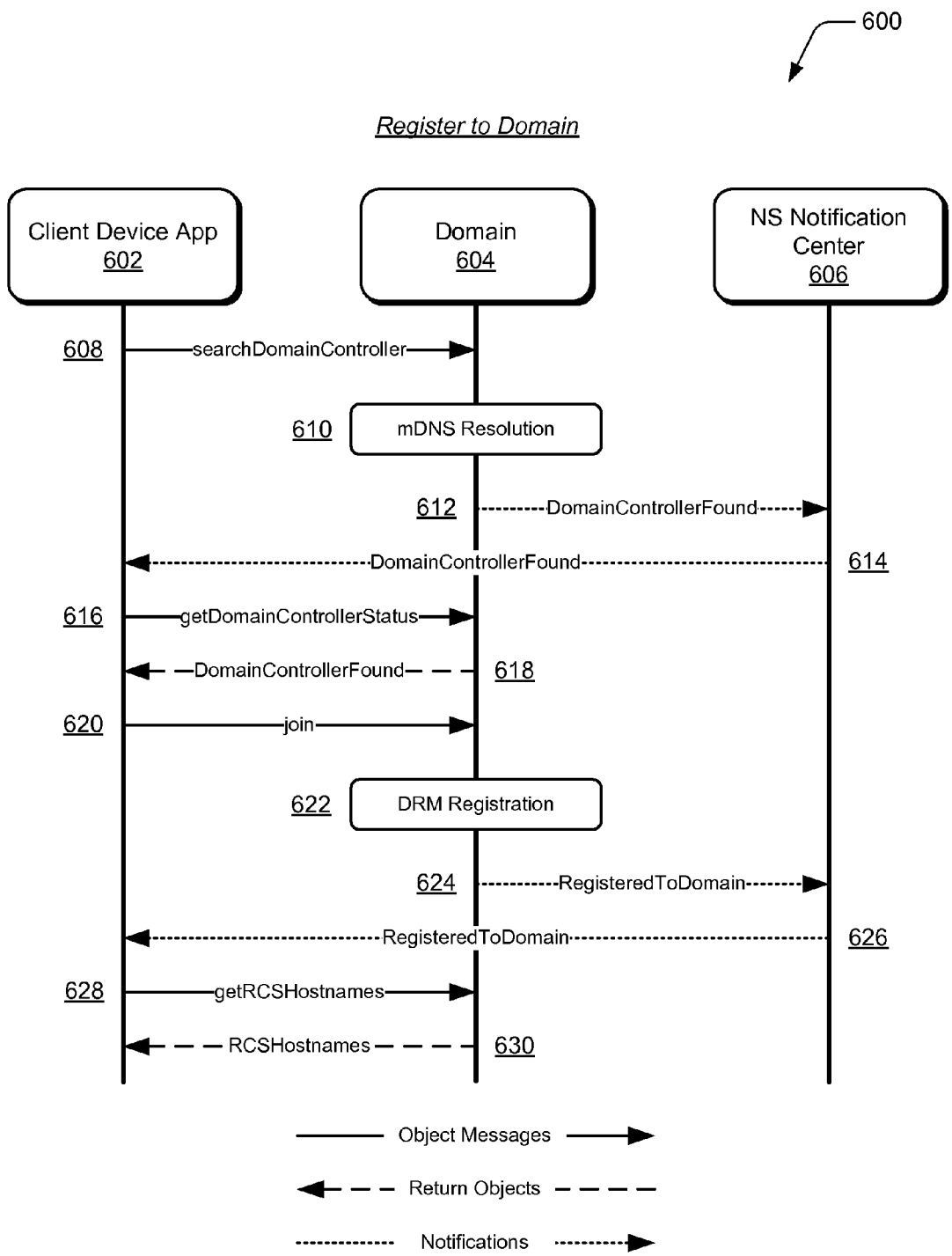
FIGS. 6-16 illustrate API object model communication sequence diagrams between the components, devices, and entities in a domain system in accordance with one or more embodiments.

FIG. 6 illustrates an example of a Register to Domain communication sequence 600 between a client device application 602 (also referred to herein as a mover client application, such as implemented on the client device 128), a domain 604, and an NS notification center 606 to register a client device to the client object model domain. The domain 604 is an example of the domain class 302 described with reference to FIG. 3, from which a domain controller can be instantiated for overall control of the object model. In the example communication sequence 600, the client device application 602 initiates a search domain controller object message 608, and the domain 604 utilizes Multicast DNS (mDNS) resolution 610 that allows the client device application to discover the domain, as described above with reference to the media server 126 shown in FIG. 1, and as described below with reference to Mover Discovery and Name Resolution in the REST API specification.

The domain 604 communicates a domain controller found notification 612 to NS notification center 606, which communicates a domain controller found notification 614 back to the client device application 602. The client device application communicates a get domain controller status message 616, and the domain returns a domain controller found object 618. The client device application then communicates a join object message 620 to the domain, which utilizes DRM registration 622 to register the client device to the domain, and communicates a registered to domain notification 624 to the NS notification center. The NS notification center returns a registered to domain notification 626 to the client device application. The client device application then communicates a get RCS hostnames object message 628 to the domain, which returns the RCS hostnames object 630 to the client device application.

Figure 7:
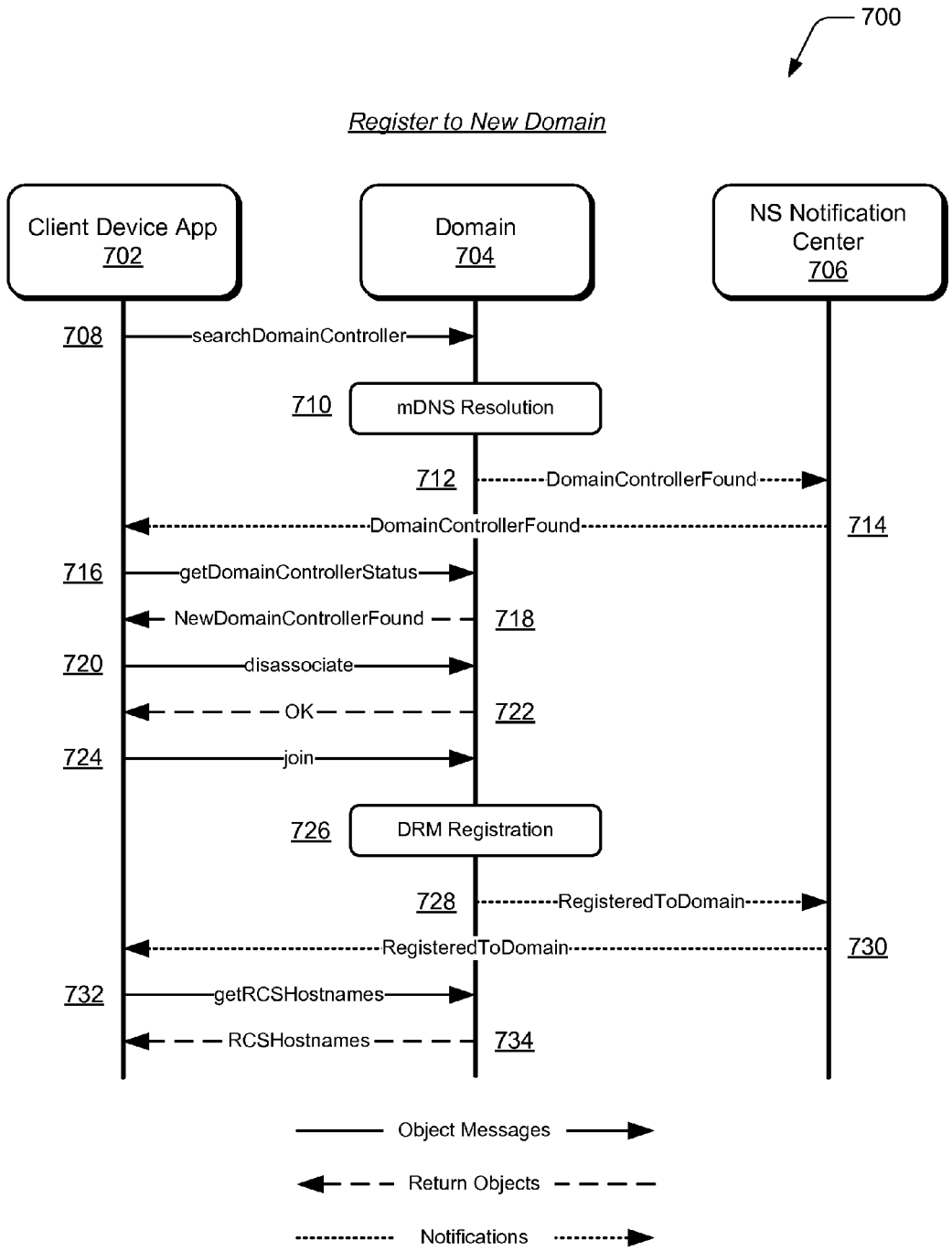

FIG. 7 illustrates an example of a Register to a New Domain communication sequence 700 between a client device application 702, a domain 704, and an NS notification center 706 to register a client device to a new domain, such as the client object model domain 302 described with reference to FIG. 3. The client device application 702 can be implemented on the client device 128 as described with reference to FIG. 1. In the example communication sequence 700, the client device application 702 initiates a search domain controller object message 708, and the domain 704 utilizes Multicast DNS (mDNS) resolution 710 that allows the client device application to discover the domain, as described above with reference to the media server 126 shown in FIG. 1, and as described below with reference to Mover Discovery and Name Resolution in the REST API specification.

The domain 704 communicates a domain controller found notification 712 to the NS notification center 706, which communicates a domain controller found notification 714 back to the client device application 702. The client device application communicates a get domain controller status message 716, and the domain returns a new domain controller found object 718. The client device application can communicate a disassociate object message 720 to the domain, and receive an ok return object 722 from the domain. The client device application then communicates a join object message 724 to the domain, which utilizes DRM registration 726 to register the client device to the new domain, and communicates a registered to domain notification 728 to the NS notification center. The NS notification center returns a registered to domain notification 730 to the client device application. The client device application then communicates a get RCS hostnames object message 732 to the domain, which returns the RCS hostnames object 734 to the client device application.

Figure 8:
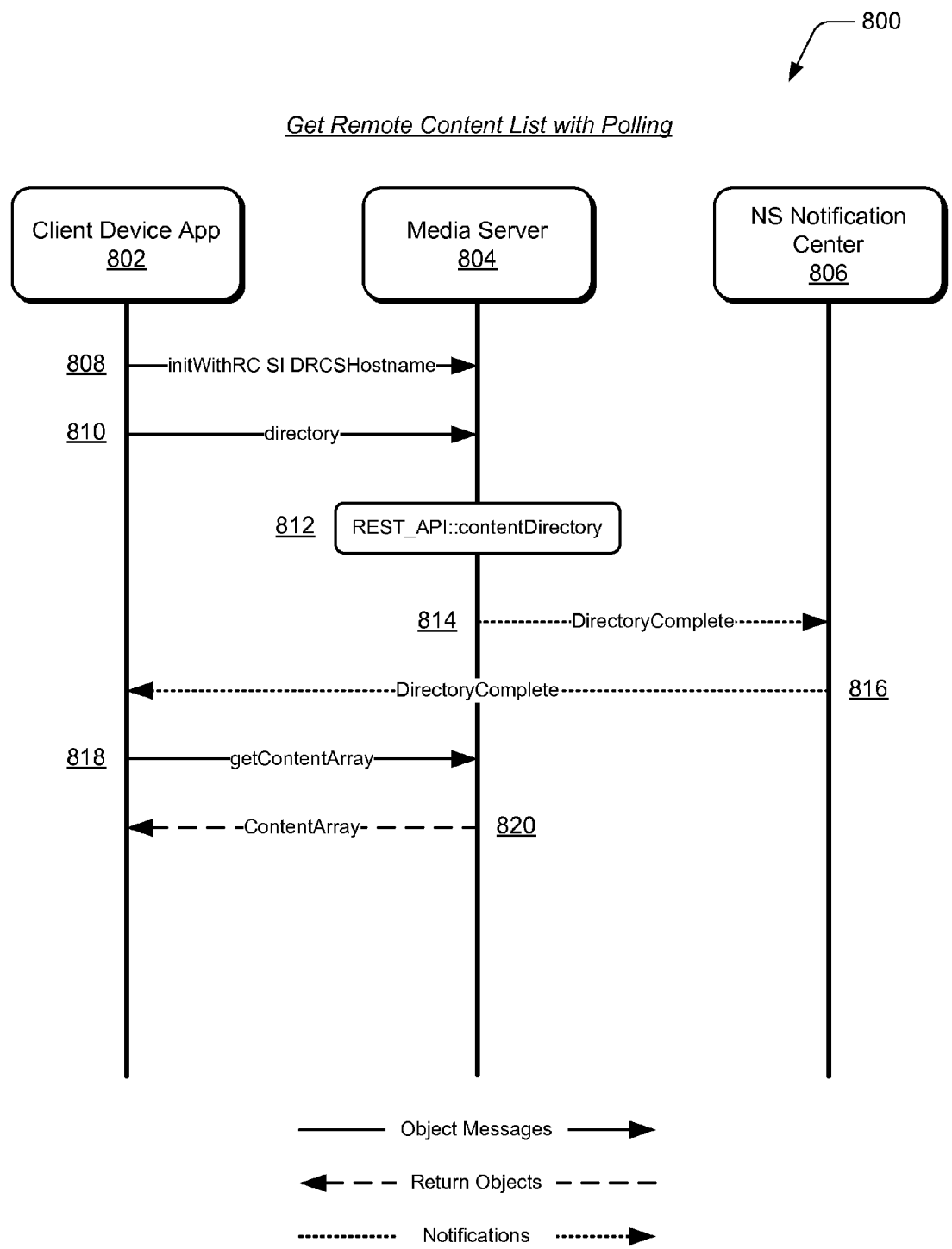

FIG. 8 illustrates an example of a Get Remote Content List with Polling communication sequence 800 between a client device application 802, a media server 804 (also referred to herein as a remote content source), and an NS notification center 806 to obtain a remote content list from the media server. The media server 804 is an example of the media server 126, and the client device application 802 can be implemented on the client device 128 as described with reference to FIG. 1. In the example communication sequence 800, the client device application 802 initiates an object message 808 (initWithRC SI DRCS Hostname), and initiates a directory object message 810. The media server 804 references the REST API content directory URI 812 that provides the list of programs currently in the media server database, such as described below with reference to the content directory URI in the REST API specification. The media server communicates a directory complete notification 814 to the NS notification center 806, which returns a directory complete notification 816 to the client device application. The client device application then communicates a get content array object message 818 to the media server, which replies with a content array return object 820.

Figure 9:
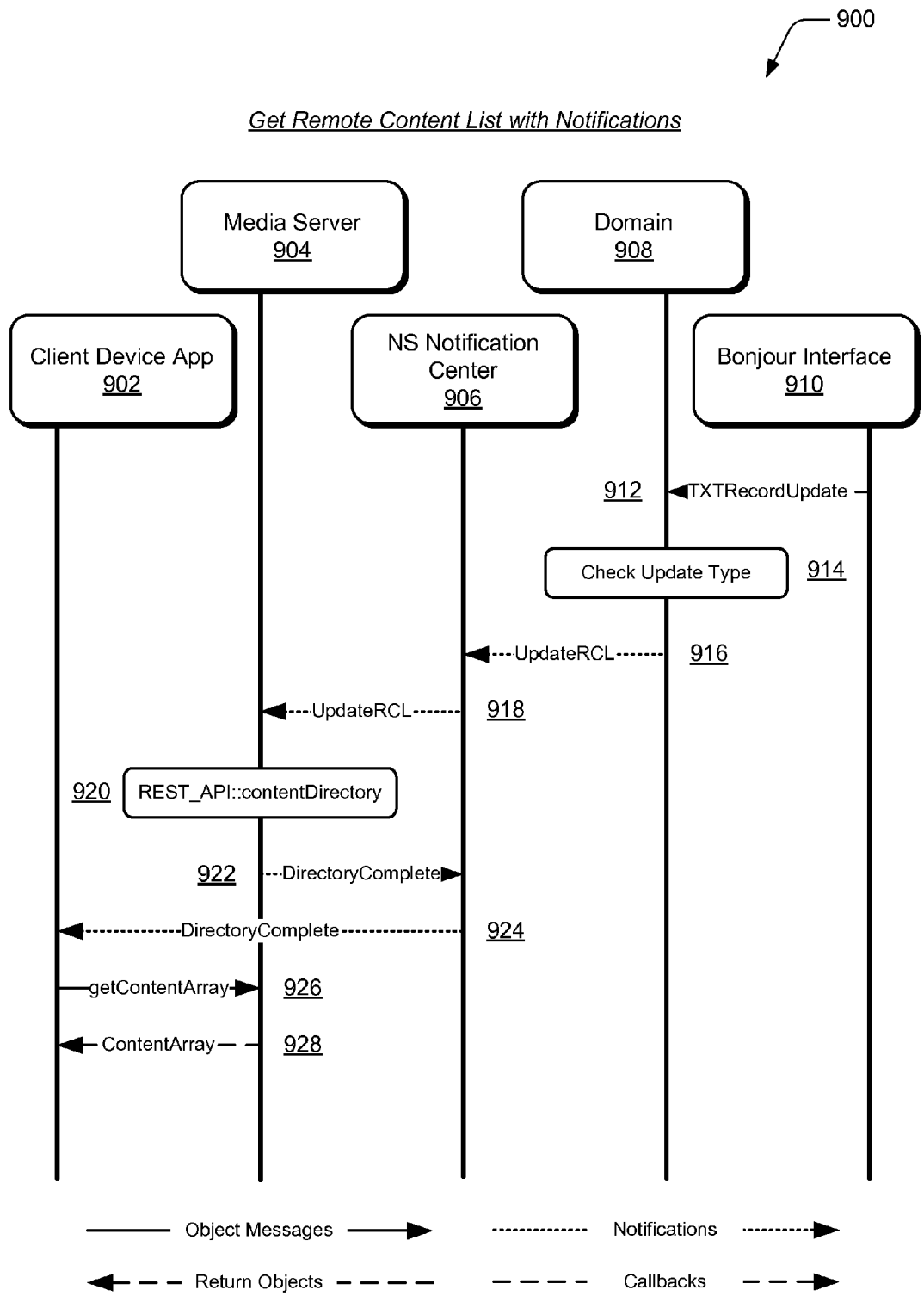

FIG. 9 illustrates an example of a Get Remote Content List with Notifications communication sequence 900 between a client device application 902, a media server 904, an NS notification center 906, a domain 908, and an interface 910 to obtain a remote content list with notifications. The media server 904 is an example of the media server 126, and the client device application 902 can be implemented on the client device 128 as described with reference to FIG. 1. Further, the domain 908 is an example of the domain class 302 described with reference to FIG. 3, from which a domain controller can be instantiated for overall control of the object model. In the example communication sequence 900, the interface 910 communicates a TXT record update object message 912 to the domain 908, which initiates a check update type 914 of remote media content. The domain communicates an update RCL notification 916 to the NS notification center 906, which communicates the update RCL notification (at 918) to the media server 904. The media server references the REST API content directory URI 920 that provides the list of programs, such as described below with reference to the content directory URI in the REST API specification.

The media server 904 communicates a directory complete notification 922 to the NS notification center 906, which returns a directory complete notification 924 to the client device application 902. The client device application then communicates a get content array object message 926 to the media server, which returns a content array object 928.

Figure 10:
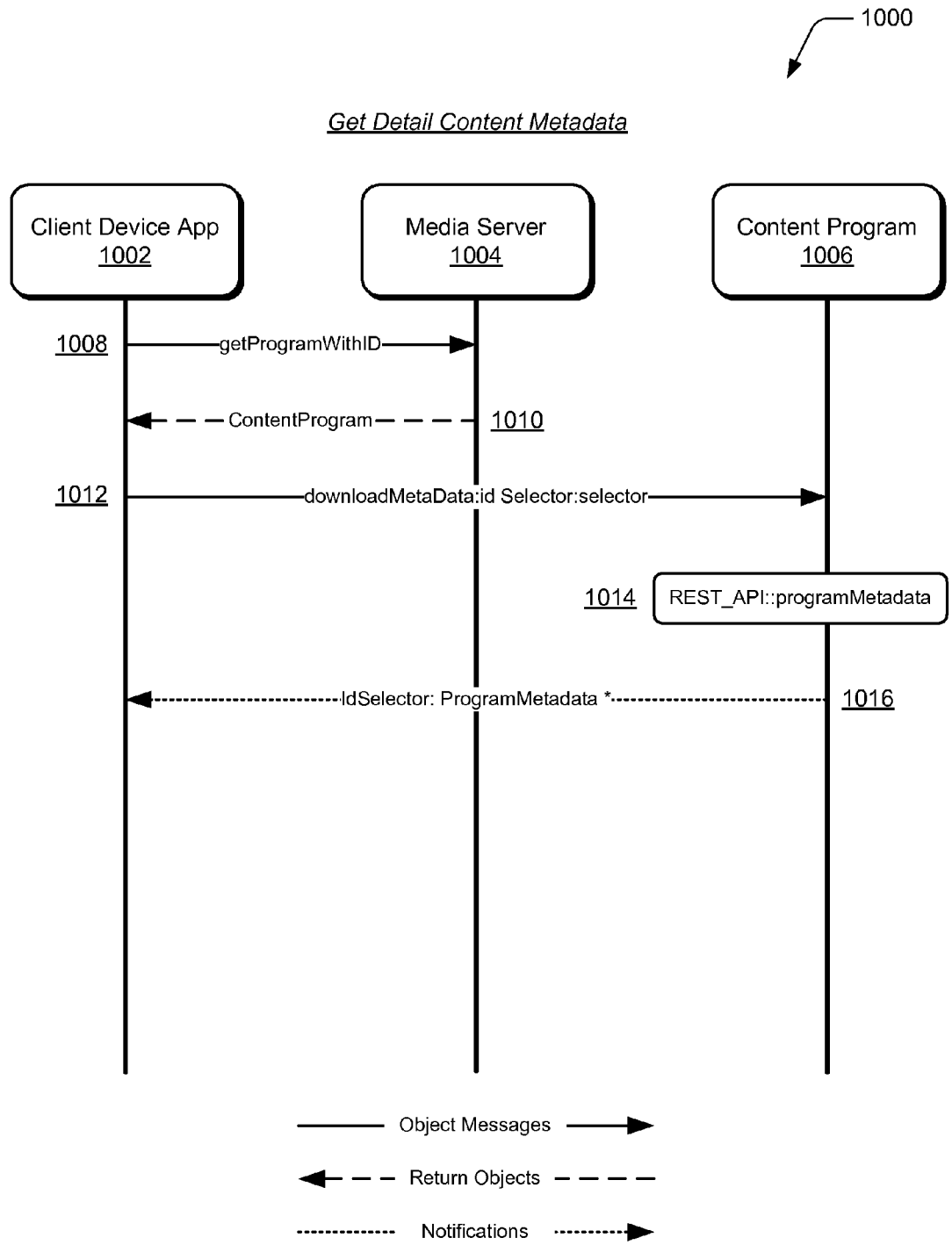

FIG. 10 illustrates an example of a Get Detail Content Metadata communication sequence 1000 between a client device application 1002, a media server 1004, and a content program object 1006 to obtain media content metadata from the media server. The media server 1004 is an example of the media server 126, and the client device application 1002 can be implemented on the client device 128 as described with reference to FIG. 1. Further, the content program object 1006 is an example of the content program class 312 in the client device API object model 300 described with reference to FIG. 3, and the content program class 312 represents one of local recorded media content (e.g., the local content source class 304) or remote streaming media content (e.g., the remote content source 306).

In the example communication sequence 1000, the client device application 1002 initiates a get program with ID object message 1008 to the media server 1004, which returns a content program object 1010. The client device application then communicates a download metadata object message 1012 (download metadata:id selector:selector) to obtain the content program 1006. The media server 1004 references the REST API program metadata URI 1014, which can be used to download the detailed program representation of any program using the program-id as described below with reference to the program metadata URI in the REST API specification. A program metadata notification 1016 (Id selector: program metadata) is then communicated back to the client device application.

Figure 11:
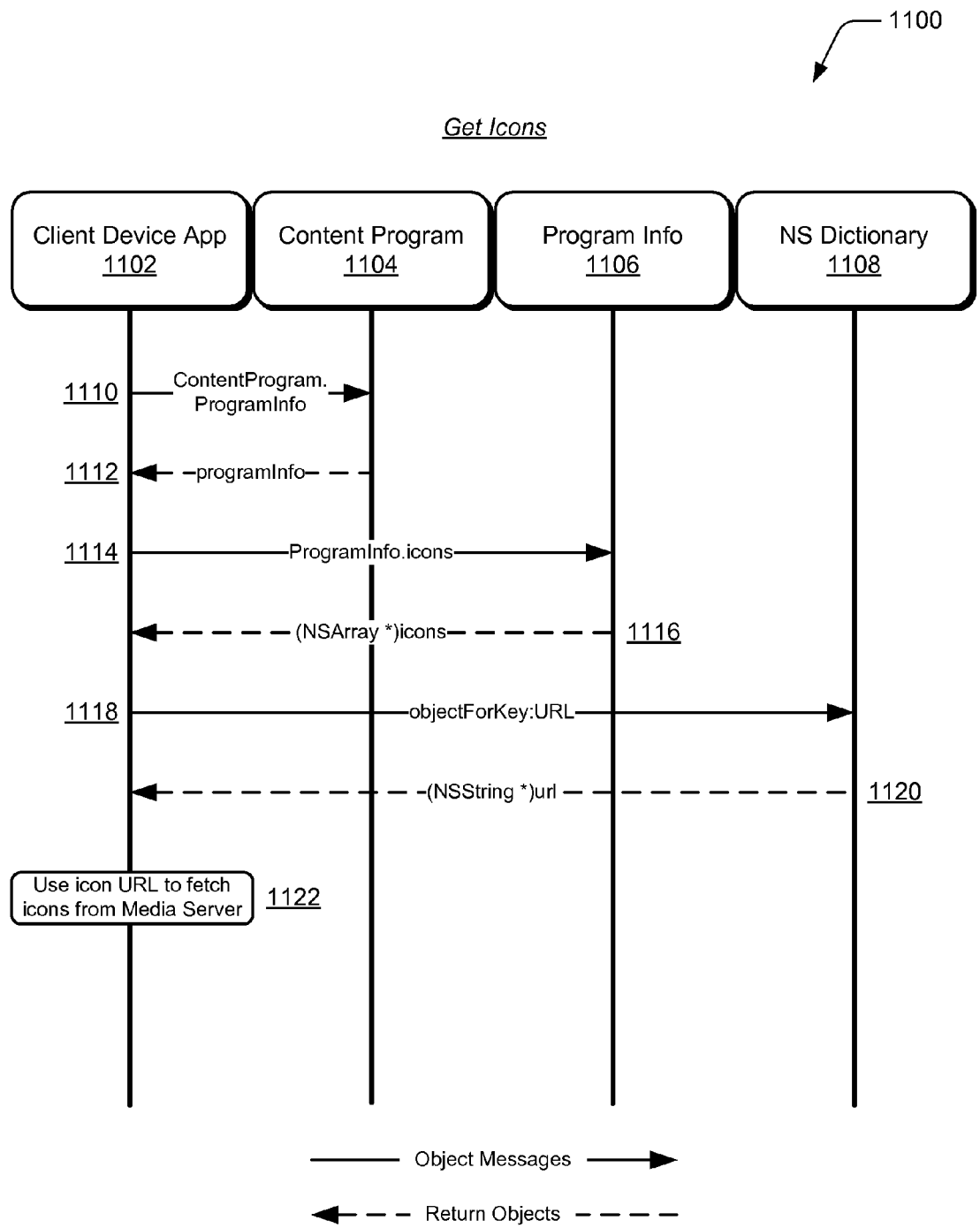

FIG. 11 illustrates an example of a Get Icons communication sequence 1100 between a client device application 1102, a content program object 1104, program info object 1106, and an NS dictionary 1108 to get icons. The client device application 1102 can be implemented on the client device 128 as described with reference to FIG. 1. Further, the content program object 1104 is an example of the content program class 312 in the client device API object model 300 described with reference to FIG. 3, and the content program class 312 represents one of local recorded media content (e.g., the local content source class 304) or remote streaming media content (e.g., the remote content source 306). The program info object 1106 is an example of the program info class 318 in the client device API object model 300, and the program info class 318 includes information about individual programs (e.g., media content, streaming media content, recorded media content, and the like).

In the example communication sequence 1100, the client device application 1102 initiates an object message request 1110 for program information, and the content program object 1104 returns the program information 1112 to the client device application. The client device application then communicates a program info.icons object message 1114 to the program info object 1106, which returns an icons array 1116 (NS array icons) to the client device application. The client device application then communicates a object for key: URL message 1118 to the NS dictionary 1108, which returns a URL string 1120 (NS string URL) to the client device application. The client device application can then use the icon URL to fetch icons from the media server at 1122 (e.g., the media server 126 as described with reference to FIG. 1.).

Figure 12:
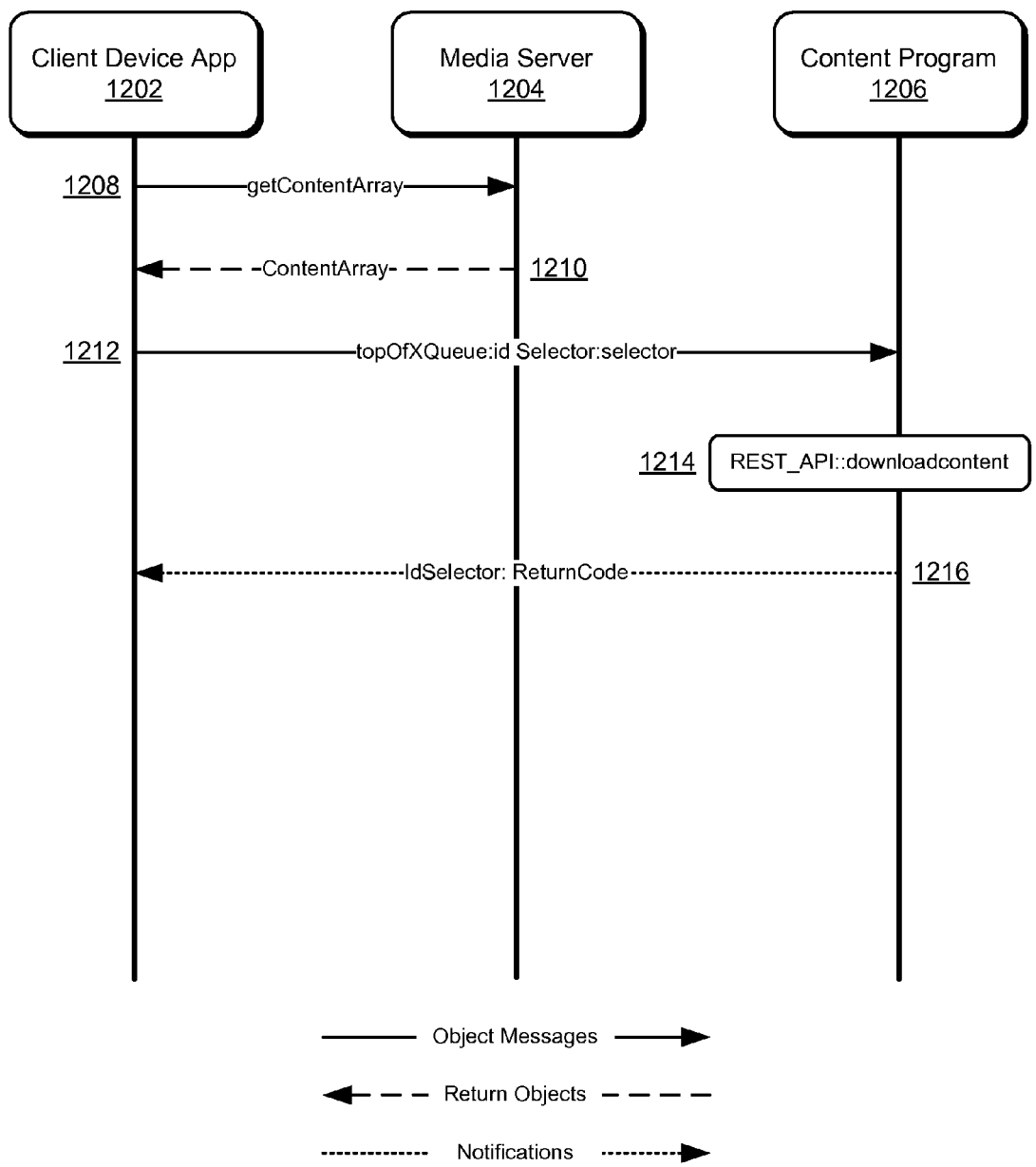

FIG. 12 illustrates an example of an Alter Transcoding Order communication sequence 1200 between a client device application 1202, a media server 1204, and a content program object 1206 to alter an order of media content transcoding at the media server. The media server 1204 is an example of the media server 126, and the client device application 1202 can be implemented on the client device 128 as described with reference to FIG. 1. Further, the content program object 1206 is an example of the content program class 312 in the client device API object model 300 described with reference to FIG. 3, and the content program class 312 represents one of local recorded media content (e.g., the local content source class 304) or remote streaming media content (e.g., the remote content source 306).

In the example communication sequence 1200, the client device application 1202 initiates a get content array object message 1208 to the media server 1204, which returns the content array object 1210 to the client device application. The client device application then communicates a top of queue object message 1212 (top of X queue: id selector:selector) to the content program object 1206. The content program object references the REST API download content URI 1214 and then returns an Id selector: return code notification 1216 to the client device application.

Figure 13:
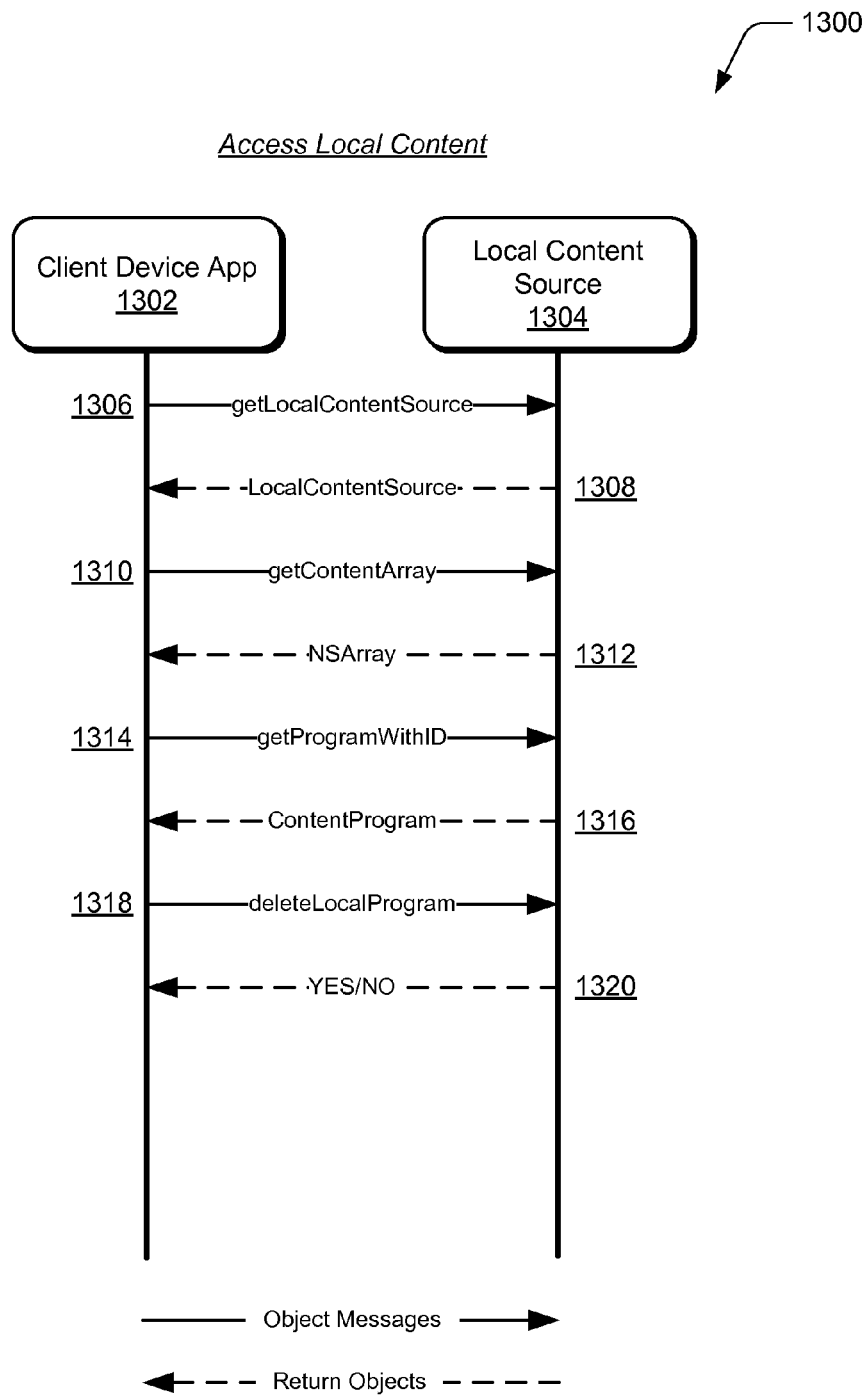

FIG. 13 illustrates an example of an Access Local Content communication sequence 1300 between a client device application 1302 and a local content source object 1304 (e.g., data storage on the client device). The client device application 1302 can be implemented on the client device 128 as described with reference to FIG. 1. Further, the local content source object 1304 is an example of the local content source class 304 in the client device API object model 300 described with reference to FIG. 3. The local content source class 304 includes functionality to control the media content that is already securely downloaded and maintained on the client device 128.

In the example communication sequence 1300, the client device application 1302 initiates a request for local media content as a get local content source object message 1306, and the local content source object 1304 returns a local content source object 1308 to the client device application. The client device application then communicates a get content array object message 1310 to the local content source object, which returns an NS array object 1312 to the client device application. The client device application then communicates a get program with ID object message 1314 to the local content source object, which returns a content program object 1316 to the client device application. The client device application then communicates a delete local program object message 1318 to the local content source object, which returns a yes or no object 1320 to the client device application.

Figure 14:
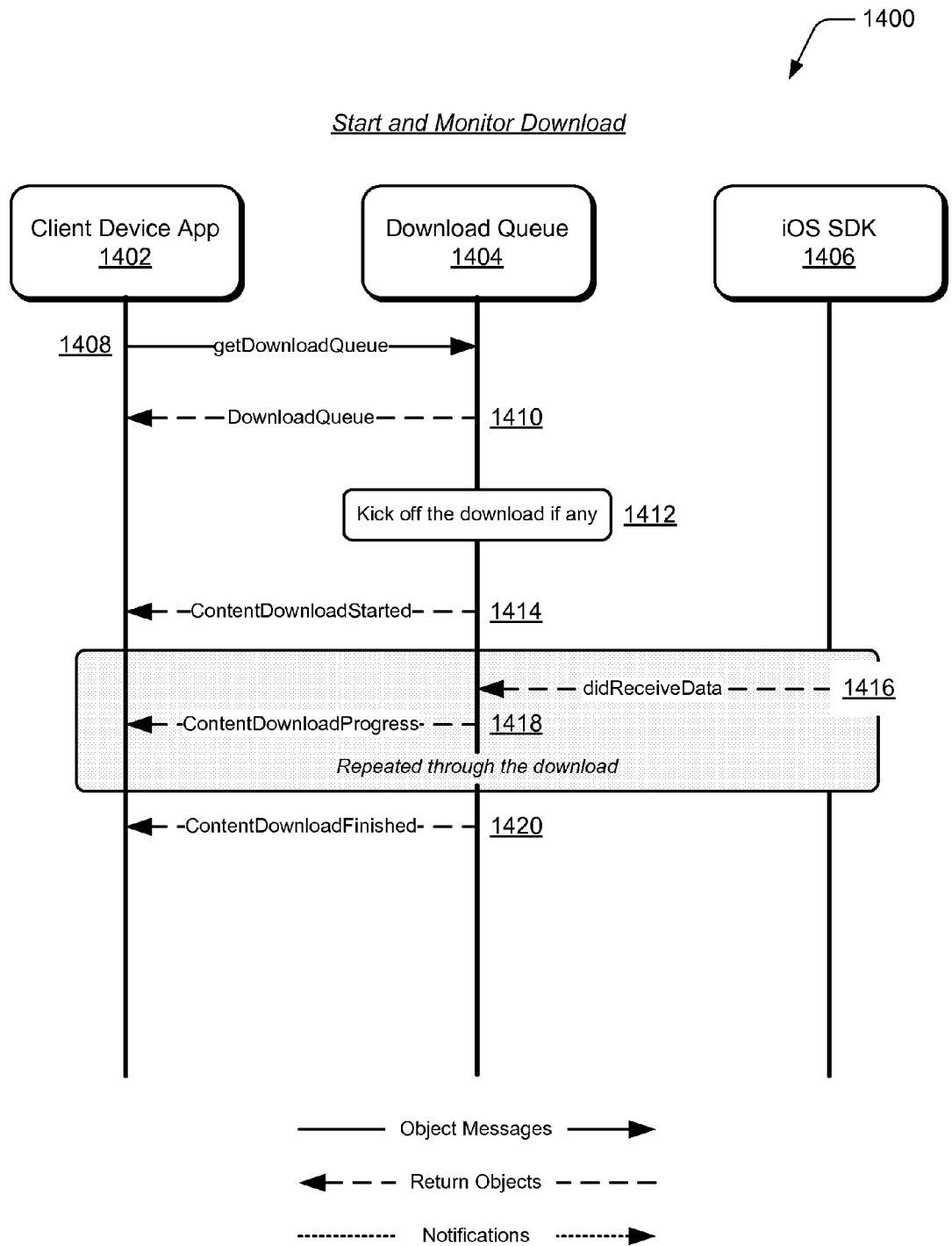

FIG. 14 illustrates an example of a Start and Monitor Download communication sequence 1400 between a client device application 1402, a download queue object 1404, and an iOS SDK 1406 to start and monitor a media content download to the client device. The client device application 1402 can be implemented on the client device 128 as described with reference to FIG. 1. Further, the download queue object 1404 is an example of the download queue class 308 in the client device API object model 300 described with reference to FIG. 3. The download queue class 308 provides methods to manage download queue entry for media content that is queued to download to the client device. The iOS SDK 1406 is an example of the operating system SDK 206 in the software stack 146 that is shown in FIG. 2, and can be implemented in the client device 128.

In the example communication sequence 1400, the client device application 1402 initiates a get download queue object message 1408 to the download queue object 1404, which returns the download queue return object 1410 to the client device application. The download queue object 1404 then begins a download 1412 of media content to the client device (if applicable), and can communicate a content download started object 1414 to the client device application. The iOS SDK 1406 communicates a did receive data return object 1416 to the download queue object 1404, which then communicates a content download progress object 1418 to the client device application. The did receive data return object 1416 from the iOS SDK and the content download progress object 1418 from the download queue object 1404 to the client device application is repeated through the download of the media content to the client device. The download queue object 1404 can then communicate a content download finished object 1420 to the client device application.

Figure 15:
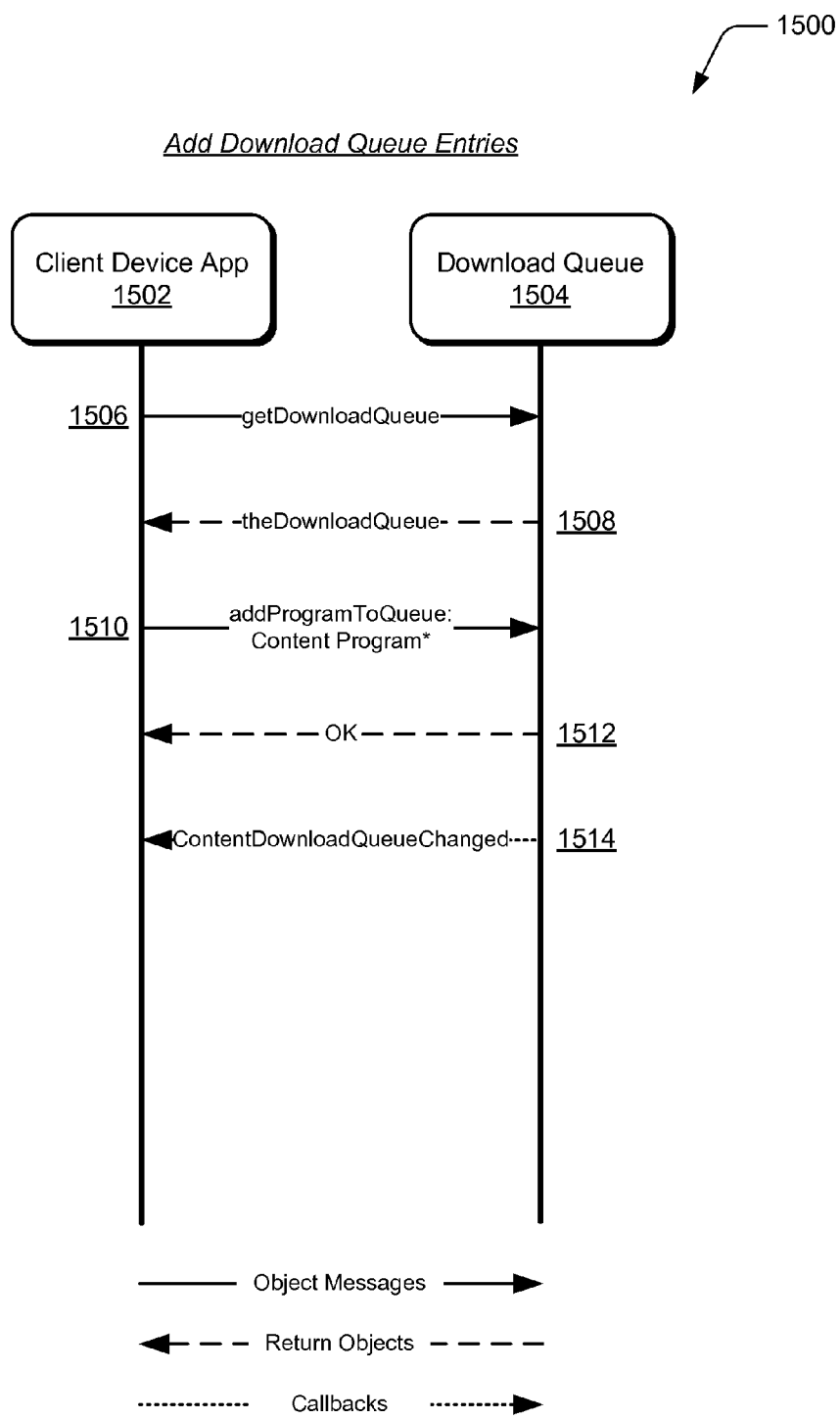

FIG. 15 illustrates an example of an Add Download Queue Entries communication sequence 1500 between a client device application 1502 and a download queue object 1504 to add additional media content to the sequence of media content in the download queue for download to the client device. The client device application 1502 can be implemented on the client device 128 as described with reference to FIG. 1. Further, the download queue object 1504 is an example of the download queue class 308 in the client device API object model 300 described with reference to FIG. 3. The download queue class 308 provides methods to manage download queue entry for media content that is queued to download to the client device.

In the example communication sequence 1500, the client device application 1502 initiates a get download queue object message 1506 to the download queue object 1504, which returns the download queue return object 1508 to the client device application. The client device application then communicates an add program to queue object message 1510 (add program to queue: content program) to the download queue object 1504, which returns an ok object response 1512 to the client device application. The download queue object also communicates a content download queue changed return object 1514 to the client device application.

Figure 16:
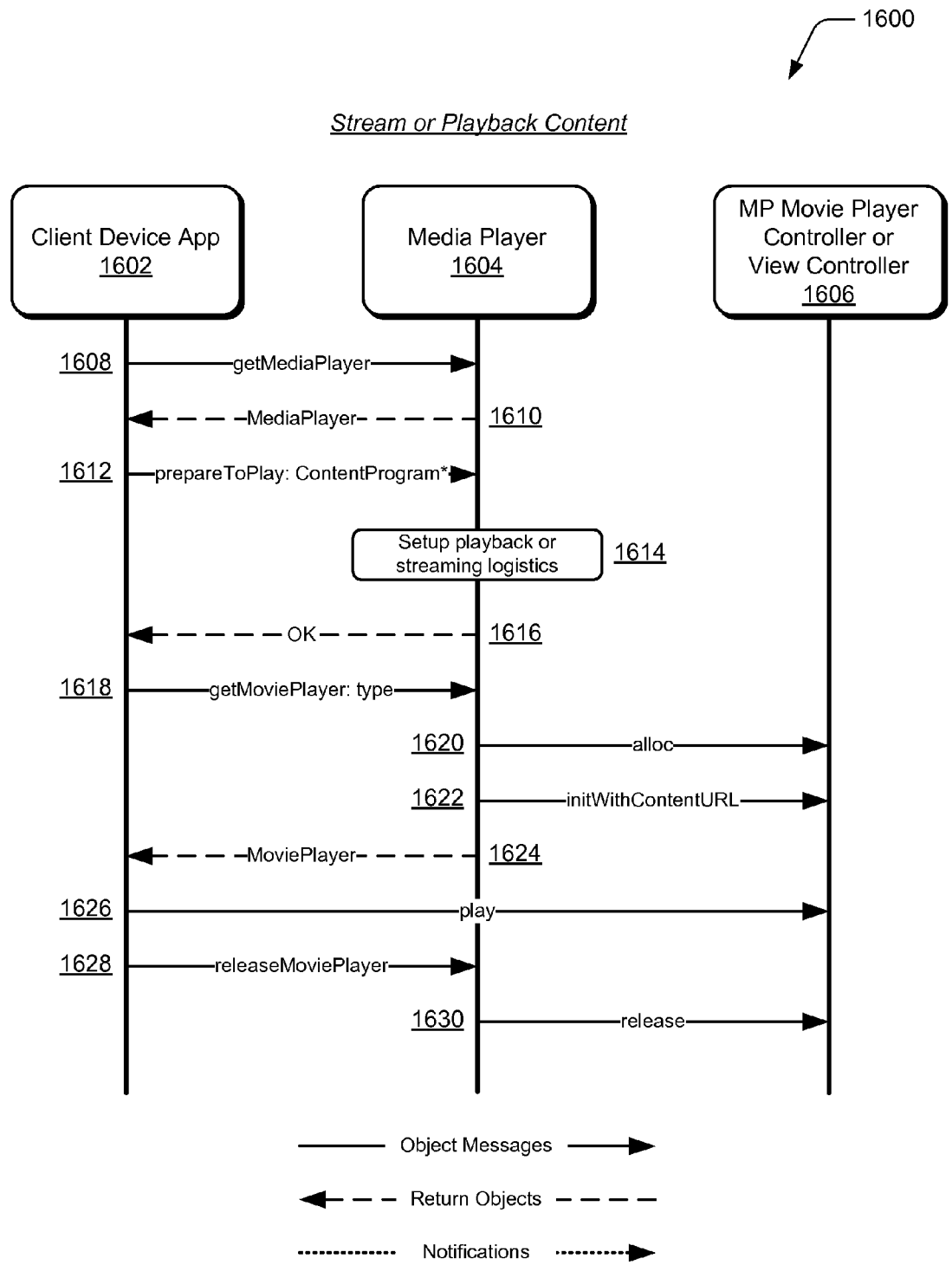

FIG. 16 illustrates an example of a Stream or Playback Content communication sequence 1600 between a client device application 1602, a media player object 1604, and an MP (MPEG) movie player controller or view controller 1606 (MP controller) to stream media content or playback media content on the client device. The client device application 1602 can be implemented on the client device 128 as described with reference to FIG. 1. Further, the media player object 1604 is an example of the media player class 310 in the client device API object model 300 described with reference to FIG. 3. The media player class represents the media player 142 that is instantiated by the proxy application 144, and includes functionality to control playback of recorded media content and/or streaming media content on the client device. The playback of the recorded media content, and playback of the streaming media content, are both different instantiations of the media player class.

In the example communication sequence 1600, the client device application 1602 initiates a get media player object message 1608 to the media player object 1604, which returns the media player return object 1610 to the client device application. The client device application then communicates a prepare to play content program object message 1612 to the media player object 1604. The media player can then setup playback or streaming logistics 1614 and communicate an ok return object 1616 to the client device application. The client device application then communicates a get movie player type object message 1618 to the media player object 1604, which in turn, communicates an allocation object message to the MP controller 1606. The media player object 1604 also communicates an init with content URL object message 1622 to the MP controller, and the media player object responds to the client device application with a movie player return object 1624. The client device application communicates a play object message 1626 to the MP controller 1606, as well as a release movie player object message 1628 to the media player 1604. The media player then communicates the release object message 1630 to the MP controller 1606.

Figure 17:
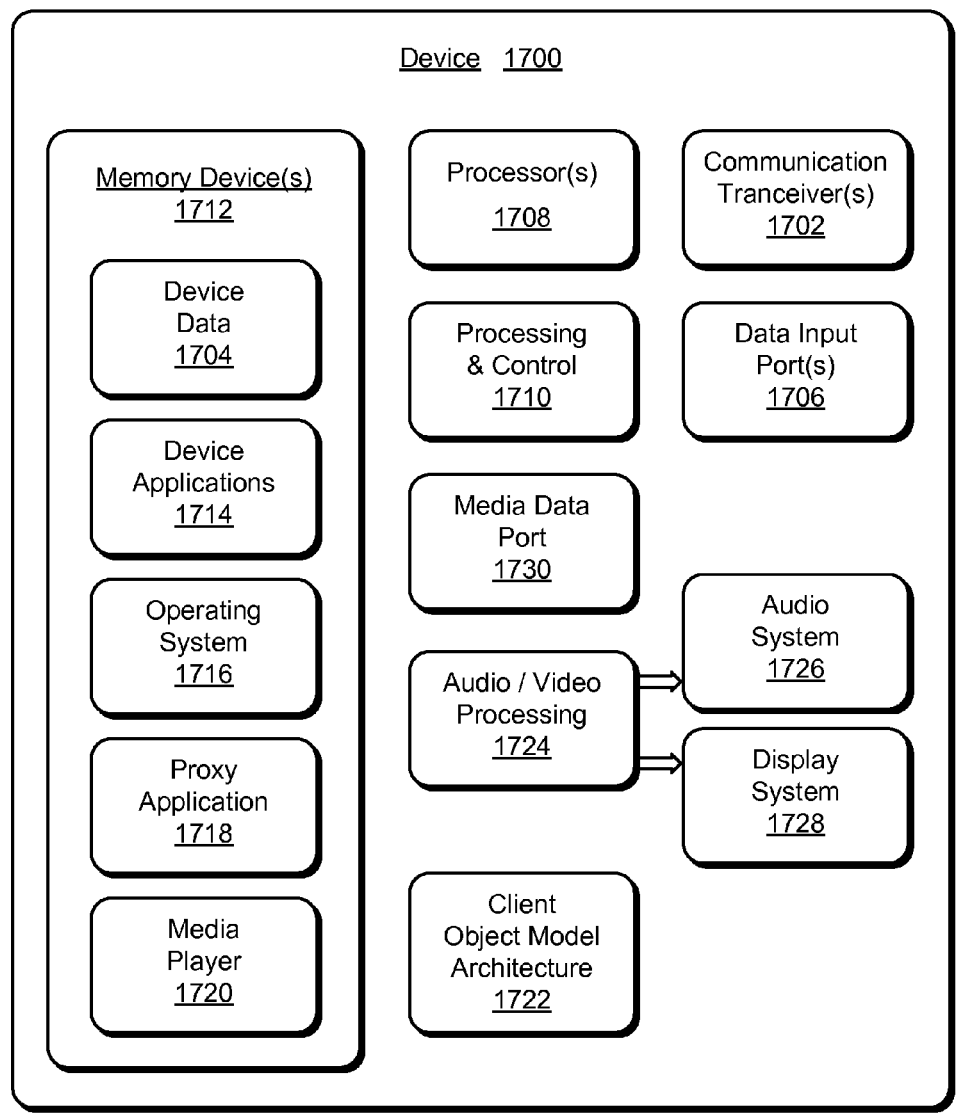
FIG. 17 illustrates various components of an example electronic device that can implement embodiments of an object model for domain-based content mobility.

FIG. 17 illustrates various components of an example electronic device 1700 that can be implemented as any device described with reference to any of the previous FIGS. 1-16. In embodiments, the electronic device may be implemented as a media server or a client device, such as described with reference to FIG. 1. Alternatively or in addition, the electronic device may be implemented in any form of device that can receive and playback streaming video content, such as any one or combination of a communication, computer, media playback, gaming, entertainment, mobile phone, and/or tablet computing device.

The electronic device 1700 includes communication transceivers 1702 that enable wired and/or wireless communication of device data 1704, such as received data, data that is being received, data scheduled for broadcast, data packets of the data, etc. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular telephony, wireless metropolitan area network (WMAN) radios compliant with various IEEE 802.15 (WiMAX™) standards, and wired local area network (LAN) Ethernet transceivers.

The electronic device 1700 may also include one or more data input ports 1706 via which any type of data, media content, and/or inputs can be received, such as user-selectable inputs, messages, music, television content, recorded video content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the electronic device to components, peripherals, or accessories such as microphones and/or cameras.

The electronic device 1700 includes one or more processors 1708 (e.g., any of microprocessors, controllers, and the like), which process computer-executable instructions to control operation of the device. Alternatively or in addition, the electronic device can be implemented with any one or combination of software, hardware, firmware, or fixed logic circuitry that is implemented in connection with processing and control circuits, which are generally identified at 1710. Although not shown, the electronic device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The electronic device 1700 also includes one or more memory devices 1712 that enable data storage, examples of which include random access memory (RAM), non-volatile memory (e.g., read-only memory (ROM), flash memory, EPROM, EEPROM, etc.), and a disk storage device. A disk storage device may be implemented as any type of magnetic or optical storage device, such as a hard disk drive, a recordable and/or rewriteable disc, any type of a digital versatile disc (DVD), and the like. The electronic device 1700 may also include a mass storage media device.

A memory device 1712 provides data storage mechanisms to store the device data 1704, other types of information and/or data, and various device applications 1714 (e.g., software applications). For example, an operating system 1716 can be maintained as software instructions within a memory device and executed on the processors 1708. The device applications may also include a device manager, such as any form of a control application, software application, signal-processing and control module, code that is native to a particular device, a hardware abstraction layer for a particular device, and so on. The electronic device may also include a proxy application 1718 and a media player 1720, such as for a client device. The electronic device also includes a client object model architecture 1722 that can be implemented in any one or combination of software, hardware, firmware, or the fixed logic circuitry to implement embodiments of an object model for domain-based content mobility.

The electronic device 1700 also includes an audio and/or video processing system 1724 that generates audio data for an audio system 1726 and/or generates display data for a display system 1728. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1730. In implementations, the audio system and/or the display system are integrated components of the example electronic device.

REST API Spec

An API specification is described herein as a Representational State Transfer (REST) software architecture. The REST API specification includes the API definitions of the object model classes that are described with reference to the client object model architecture 300 shown in FIG. 3. The REST API specification includes Resource URIs (uniform resource identifiers), which are implemented as:

Content Directory URI: (refers to programs that are available for download)
http://{portal-server}/programs/contentdirectory
Program Metadata URI:
http://{portal-server}/programs/{program-id}
Set transcode mode:
http://{content-server}/content/
   settranscodemode?m=<CO/NONE>
Transcode Priority URI:
http://{content-server}/content/{program-id}
Domain URI:
http://{domain-server}/domain/{device-id}
Content Control Profile URI:
http://{domain-server}/domain/contentControlProfile Mover Discovery and Name Resolution As noted above, the media server is also referred to herein as the Mover. The Mover Runtime environment and software architecture are shown in FIGS. 1 and 2. In an embodiment of a Mover application, the Mover serves as the portal server, the content server, as well as the domain server. Prior to launching any of the Resource URIs above, the client device discovers the Mover's server name that can be used to resolve to the Mover IP address, as described with reference to FIG. 6. The Mover supports the Multicast DNS (mDNS) for the name discovery and IP address resolution mechanism. The mDNS protocol lets the client device discover the Mover by obtaining its fully-qualified name (FQN) and its IP address. First the client multicasts a query looking for the Mover, and then the Mover's mDNS server responds to the request by providing the FQN and the IP address. With that, the client device builds its name resolution table, and when the Mover's FQN is used in the HTTP URI, the message will be sent to the Mover correctly.

Mover Status Update Notification

The mDNS protocol also supports event notifications. The Mover uses this mechanism to notify the client devices when the status changes in some way. The scope of status updates includes the default ratings PIN, the default rating ceiling, the default content advisory settings and channel blocks, the content metadata and repository, and a notification that user intervention is required via the Mover local Web configuration page (for example, that flash memory needs configuration). Note that the ratings related status data is protected. If ratings information of content information has changed, the client devices would normally launch the relevant resource URI.

Method Overview

Methods include:

| Resource (next line): Method | Returns | HTTP Return Codes |
| --- | --- | --- |
| http://{portal-server}/programs/{program-id} | | |
|    GET | PROGRAM metadata | 200 (OK), 404 |
| http://{portal-server}/programs/contentdirectory | | |
|    GET | Content Directory List | 200 (OK), 404 |
| http://{content-server}/content/settranscodemode | | |
|    POST | | 200 (OK), 404 |
| http://{content-server}/content/{program-id} | | |
|    GET | | 200 (OK), 404, 405 |
| http://{domain-server}/domain/{device-id} | | |
|    PUT | | 200 (OK), 401, 402, 403, 404 |
| http://{domain-server}/domain/{device-id} | | |
|    DELETE | | 200 (OK), 404 |
| http://{domain-server}/domain/contentControlProfile | | |
|    GET | A protected data blob describing the subject | 200 (OK), 404 |

Representation MIME Types

The following mime types are used for resource representation:
text/xml for metadata representations;
video/mpeg for video;
application/vnd.motorola.iprm for IPRM encrypted video; and
application/x-dtcp1 for DTCP encrypted video.

Abbreviations Used

The following abbreviations are used:

| | |
| --- | --- |
| {portal-server} | Portal Server that implements the RESTful web service. |
| {content-server} | Server for accessing content payload. |
| {domain-server} | The server that enforces domain control rules. |
| {streaming-server} | The server that provides HLS streaming. |

Content Directory

Description: The content directory URI provides the list of programs that are currently in the Mover database. This is further described above with reference to the media server object 804 (FIG. 8) that references the REST API content directory URI 812, and with reference to the media server object 904 (FIG. 9) that references the REST API content directory URI 920, which provides the list of programs currently in the media server database.

Sequence Number: The sequenceNumber element in the response message indicates to the client application whether the content list is changed from last time. A new sequence number indicates a change.

Transcoding Status: The status element indicates one of the four transcoding status: ready (for download or streaming), being processed (i.e. being transcoded), pending (for processing) and not available (e.g. ratings blocked, or bad content). Note that all directory items returned in a response that are marked pending are returned in transcoder queue (priority) order, with the first listing at the highest priority, meaning, next to be transcoded.

Content Usage: The usageAllowed element signals what kinds of use cases are allowed for the content. The table below specifies mapping between the usageAllowed metadata value and the client use cases allowed:

| <usageAllowed> | Use Case(s) allowed |
| --- | --- |
| stream | Streaming |
| move | Streaming, Move |
| copy | Streaming, Copy |

Content Ratings: The content ratings values are listed below. A program can assume one and only one rating. Note that these values are defined by the MPAA and the TV Parental Guidelines Monitoring Board. The content rating values include Not Rated, TV-Y, TV-Y7, TV-G, G, TV-PG, PG, PG-13, TV-14, TV-MA, R, NC-17, and Adult.

Parental Control Categories: The values for parental control categories are listed below. A program can assume one or multiple categories. Note that these values are defined by the TV Parental Guidelines Monitoring Board. The parental control categories values include Adult Situation, Brief Nudity, Sexual Situations, Rape, Nudity, Strong Sexual, Language, Strong Language, Graphic Language, Explicit Language, Fantasy Violence, Mild Violence, Violence, and Graphic Violence.

URI and Defined Methods:

| | |
| --- | --- |
| URI | http://{portal-server}/programs/contentdirectory |
| METHODS | GET |
| RETURN VALUES | 200 OK & XML (program list), 404 (Not Found) |

GET Implementation:

```
GET http://{portal-server}/programs/contentdirectory
RETURNS:            {list of programs}
<?xml version="1.0" encoding="UTF-8"?>
<moverContent>
<moverProtocolVersion>1.0</moverProtocolVersion>
<sequenceNumber>102</sequenceNumber>
    <program channel="53044" ... > ... </program >
    ...
</moverContent>
```

The example below shows a list of two content items, one with program-id TOD55341 and the other with TOD55342. The first program comes with two content URLs, a type 1 and a type 2. The variant attribute corresponds to the device type (see the device registration for details). The client application is recommended to use the URL that matches its device type or the content playback might fail or present a suboptimal experience. The icon element specifies where to get the program thumbnail. There are two icon elements in the first program, intended to match the best usage for a type 1 and type 2 device respectively. The height element and the width element show example values.

```
GET http://{portal-server}/programs/contentdirectory
RETURNS:
<?xml version="1.0" encoding="UTF-8"?>
<moverContent>
<moverProtocolVersion>1.0</moverProtocolVersion>
<sequenceNumber>102</sequenceNumber>
<program channel="53044" channelName="NBC" program-id="TOD55341" showtype="Series"
start="2009-05-29T18:01:00Z" stop="2009-05 29T19:00:00Z">
<seriesName lang="">Northern Exposure</seriesName>
<programName lang="">A Wing and a Prayer</programName>
<status>ready</status>
<usageAllowed>stream</usageAllowed>
<rating>PG</rating>
<parentalControlCategory>
    <contentCategory>Language</contentCategory>
</parentalControlCategory>
<icon height="32" src="http://192.168.4.12:7001/portalaccess/images/aptn_logo_94x90.jpg"
width="32"/>
< icon height="48" src="http://192.168.4.12:7001/portalaccess/images/aptn_logo_194x190.jpg"
width="48"/>
<content-url href="http://192.168.4.12/content/TOD55341.mp4" variant="type 1"
protectionType="IPRM" filesize="12345678" contentID="xyz001" />
<content-url href="http://192.168.4.12/content/TOD55341-1.mp4" variant="type 2"
rotectionType="IPRM" filesize="12345678" contentID="xyz001" />
</program>
<program channel="53044" channelName="NBC" program-id="TOD55342" showtype="Series"
start="2009-05-29T19:01:00Z"stop="2009-05-29T20:00:00Z">
<seriesName lang="">Chuck</seriesName>
<programName lang="">The Missing Old Man</programName>
<status>pending</status>
<usageAllowed>copy</usageAllowed>
<rating>R</rating>
<parentalControlCategory>
    <contentCategory>Violence</contentCategory>
    <contentCategory>Language</contentCategory>
```

```
<contentCategory>Nudity</contentCategory>
</parentalControlCategory>
<icon height="32" src="http://192.168.4.12:7001/portalaccess/images/aptn_logo_94x90.jpg" width="32"/>
<content-url href="http://content-server/content/TOD55342" variant="type 1" protectionType="DTCP-IP" filesize="12345678" contentID="xyz002" />
</program>
</moverContent>
```

Program Metadata

Description: The program metadata URI is a pre-defined URI which can be used to download the detailed program representation of any program using the program-id. This is further described above with reference to the content program object 1006 (FIG. 10) that references the REST API program metadata URI 1014, which can be used to download the detailed program representation of any program using the program-id. The URI and Defined Methods:

| URI | http://{portal-server}/programs/{program-id} |
|---|---|
| METHODS | GET |
| RETURN VALUES | 200 OK & XML (program metadata), 404 (Not Found), |

GET Implementation: See Example. Two examples are shown below. Example 1 shows the case where the metadata is protected and base64 encoded, and the second example shows clear metadata. In order to produce the clear metadata, the client app must use the <protectionType> and apply the right scheme to it.

```
GET http://{portal-server}/programs/ TOD55341
RETURNS:                  (metadata for a single program)
<?xml version="1.0" encoding="UTF-8"?>
<moverContent>
<moverProtocolVersion>1.0</moverProtocolVersion>
<protectedMetadata>
   {a base64 encoded binary data blob}
</protectedMetadata>
</moverContent>
```

```
GET http://{portal-server}/programs/ TOD55341
RETURNS:                  (metadata for a single program)
<?xml version="1.0" encoding="UTF-8"?>
<moverContent>
<moverProtocolVersion>1.0</moverProtocolVersion>
<program channel="53044" channelName="NBC"
program-id="TOD55341" showType="Series"
start="2009-05-29T18:01:00Z" stop="2009-05-29T19:00:00Z"
closeCaptioned="true">
<seriesName lang="">Northern Exposure</seriesName>
<desc lang="">Maggie hires Maurice to help her build an ultralight, then
fires him when he gets bossy; Ed betrays Ruth-Annes confidence.</desc>
<credits>
<actor>Rob</actor>
<actor>Steve</actor>
<director>Mohan</director>
<director>Wendell</director>
<producer>Dev</producer>
</credits>
<audio present="yes" stereo="yes" />
<episode-num system="xmltv_ns">77720</episode-num>
</program>
</moverContent>
```

Set Transcode Mode

URI and Defined Methods. Description: This URI is a command to the content server, indicating whether it should transcode the Copy Once content or not, in an automatic fashion.

| URI | http://{content-server}/content/settranscodemode?m=<CO/NO> |
|---|---|
| METHODS | POST |
| RETURN VALUES | 200 OK, 404 (fail) |

GET Implementation: Parameter CO: Transcode Copy Once content automatically. Parameter NO: Do NOT transcode Copy Once content automatically; rather, transcode each such content item on request.

```
GET http://{content-server}/content/transcodemode?m=<CO/NO>
RETURNS:
```

Transcode Priority

URI and Defined Methods:

| URI | http://{content-server}/content/{program-id} |
|---|---|
| METHODS | GET |
| RETURN VALUES | 200 (Priority Raised), 404 (Not Found), 405 (Failed to raise Priority) |

Return Value Notes: The return value 200 indicates the priority of the requested program has been raised. The return value 404 indicates program not found. The return value 405 indicates the priority of the requested program cannot be raised. GET Implementation:

```
GET http://{content-server}/content/{program-id}
RETURNS:
```

Device Registration

Descriptions: To register a new client device to the Mover domain, a PUT message is sent to the 'domain' URI with the device-id appended to the end. The body of the PUT method includes the data elements defined below. URI and Defined Methods:

| URI | http://{domain-server}/domain/{device-id} |
|---|---|
| METHODS | PUT |
| RETURN VALUES | 200 OK, 401 (Ill-formed body), 402 (Duplicate device ID), 403 (protection type not supported), 404 (Exceeds maximum number of devices allowed), |

PUT Implementation

```
PUT http://{domain-server}/domain/{device-id}
<?xml version="1.0" encoding="UTF-8"?>
<clientDevice>
  <deviceID>{device-id}</deviceID>
  <deviceName>{device-name}</deviceName>
  <deviceType>{device-type}</deviceType>
  <protectionType>{device-protection-type}</protectionType>
</clientDevice>
```

PUT Data Elements:

{device-id}: The device ID is a base64-encoded binary string that uniquely identifies the client device according to its DRM certificate. For a device with IPRM certificates, it has a 48-bit Host ID, and for a device with DTCP certificates, it has a 40-bit Device ID.

{device-name}: The device name is a user-friendly string, determined by the client's user. All printable characters and blank spaces are allowed.

{device-type}: The device type field signals the type of user device, i.e., type 1 or type 2. A type 1 device would support half-VGA resolution H.264 baseline profile video coding, AAC audio coding, and an MP4 file container. A type 2 device would support type 1 content as well as VGA resolution H.264 main profile video coding, AAC audio coding, and an MP4 file container. In either type, the MP4 file is an ISO/IEC 14496 standard part 14 format, further qualified to guarantee that the moov box is located before any mdat box, and there will be only one mdat box in the whole content file. This qualification allows progressive download support.

{device-protection-type}: The device protection type signals the type of security being supported by the device, e.g., IPRM or DTCP-IP.

EXAMPLE

```
PUT http://{domain-server}/domain/{aBase64EncodedString}
<?xml version="1.0" encoding="UTF-8"?>
<clientDevice>
  <deviceID>{aBase64EncodedString}</deviceID>
  <deviceName>Library PC</deviceName>
  <deviceType>type 1</deviceType>
  <protectionType>DTCP-IP</protectionType>
</clientDevice>
```

Device De-registration

Description: To de-register a client device from the Mover domain, a DELETE message is sent to the 'domain' URI with the device-id appended to the end. URI and Defined Methods:

| URI | http://{domain-server}/domain/{device-id} |
|---|---|
| METHODS | DELETE |
| RETURN VALUES | 200 OK, 404 (Not Found) |

DELETE Implementation—Example:

```
DELETE http://{domain-server}/domain/{aBase64EncodedString}
```

Content Control Profile

Description: The Content Control Profile URI retrieves the Mover content control profile, including the rating's ceiling, the content advisory information, the PIN and the channel block information. URI and Defined Methods:

| URI | http://{domain-server}/domain/contentControlProfile |
|---|---|
| METHODS | GET |
| RETURN VALUES | 200 OK & XML (status metadata), 404 (Not Found) |

Examples: The example below shows a GET request and the response XML metadata. Note that the metadata is encrypted with a secret key and the client needs to decrypt it first and then parse out the detailed data items. The <profileProtectionType> data item signals what kind of protection scheme is applied.

```
GET http://{domain-server}/domain/contentControlProfile
RETURNS:       (protected metadata of the Mover status update)
<?xml version="1.0" encoding="UTF-8"?>
<contentControlProfile>
  <moverProtocolVersion>1.0</moverProtocolVersion>
  <sequenceNumber>2475</sequenceNumber>
  <profileProtectionType>PPT-1</profileProtectionType>
  <profileData>
    {a base64 encoded binary data blob}
  </profileData>
</contentControlProfile>
```

Status Metadata Examples: The example below shows a set of content control profile after it's been unscrambled.

```
<?xml version="1.0" encoding="UTF-8"?>
<contentControlProfile>
  <moverProtocolVersion>1.0</moverProtocolVersion>
  <sequenceNumber>2475</sequenceNumber>
  <PIN>1234</PIN>
  <contentBlocking>
    <rating>PG-13</rating>
    <parentalControlCategory>
      <contentCategory>Violence</contentCategory>
      <contentCategory>Rape</contentCategory>
      <contentCategory>Language</contentCategory>
      <contentCategory>Nudity</contentCategory>
    </parentalControlCategory>
    <channelBlock>
      <channel>73</channel>
      <channel>103</channel>
      <channel>765</channel>
    </channelBlock>
  </contentBlocking>
</contentControlProfile>
```

XML Schemas

Content Directory Schema

```xml
<?xml version="1.0" encoding="utf-8"?>
<xs:schema xmlns:xs="http://www.w3.org/2001/XMLSchema"
xmlns:wmh="http://www.wmhelp.com/2003/eGenerator"
elementFormDefault="qualified">
    <xs:element name="moverContent">
        <xs:element name="moverProtocolVersion" type="xs:string"/>
        <xs:element name="sequenceNumber" type="xs:string"/>
        <xs:complexType>
            <xs:sequence>
                <xs:element ref="program" maxOccurs="unbounded"/>
            </xs:sequence>
        </xs:complexType>
    </xs:element>
    <xs:element name="program">
        <xs:complexType>
            <xs:attribute name="channel" type="xs:string" use="required"/>
            <xs:attribute name="channelName" type="xs:string"
            use="required"/>
            <xs:attribute name="program-id" type="xs:string"
            use="required"/>
            <xs:attribute name="showtype" type="xs:string"/>
            <xs:attribute name="start" type="xs:string"
            use="required"/>
            <xs:attribute name="stop" type="xs:string" use="required"/>
            <xs:element ref="seriesName"/>
            <xs:element ref="programName"/>
            <xs:element ref="status"/>
            <xs:element ref="usageAllowed"/>
            <xs:element ref="rating"/>
            <xs:element ref="parentalCotrolCategory"/>
            <xs:sequence>
                <xs:element ref="icon"/>
                <xs:element ref="content-url" maxOccurs="unbounded"
                minOccurs="1"/>
            </xs:sequence>
        </xs:complexType>
    </xs:element>
    <xs:element name="seriesName">
        <xs:complexType>
            <xs:simpleContent>
                <xs:extension base="xs:string">
                    <xs:attribute name="lang" type="xs:string" use="required"/>
                </xs:extension>
            </xs:simpleContent>
        </xs:complexType>
    </xs:element>
    <xs:element name="programName">
        <xs:complexType>
            <xs:simpleContent>
                <xs:extension base="xs:string">
                    <xs:attribute name="lang" type="xs:string" use="required"/>
                </xs:extension>
            </xs:simpleContent>
        </xs:complexType>
    </xs:element>
    <xs:element name="icon">
        <xs:complexType>
            <xs:attribute name="height" type="xs:string" use="required"/>
            <xs:attribute name="src" type="xs:string" use="required"/>
            <xs:attribute name="width" type="xs:string" use="required"/>
        </xs:complexType>
    </xs:element>
    <xs:element name="content-url">
        <xs:complexType>
            <xs:attribute name="href" type="xs:string" use="required"/>
            <xs:attribute name="variant" type="xs:string" use="required"/>
            <xs:attribute name="protectionType" type="xs:string"
            use="required"/>
                <xs:attribute name="filesize" type="xs:string"/>
                <xs:attribute name="contentID" type="xs:string"/>
        </xs:complexType>
    </xs:element>
    <xs:element name="status">
        <xs:simpleType>
            <xs:restriction base="xs:string">
                <xs:enumeration value="ready"/>
                <xs:enumeration value="being processed"/>
                <xs:enumeration value="pending"/>
                <xs:enumeration value="toBeSelected"/>
                <xs:enumeration value="not available"/>
            </xs:restriction>
        </xs:simpleType>
    </xs:element>
    <xs:element name="usageAllowed"/>
        <xs:simpleType>
            <xs:restriction base="xs:string">
                <xs:enumeration value="stream"/>
                <xs:enumeration value="copy"/>
                <xs:enumeration value="move"/>
            </xs:restriction>
        </xs:simpleType>
    </xs:element>
    <xs:element name="protectionType"/>
        <xs:simpleType>
            <xs:restriction base="xs:string">
                <xs:enumeration value="IPRM"/>
                <xs:enumeration value="DTCP-IP"/>
            </xs:restriction>
        </xs:simpleType>
    </xs:element>
    <xs:element name="rating">
        <xs:simpleType>
            <xs:restriction base="xs:string">
                <xs:enumeration value="Not Rated"/>
                <xs:enumeration value="TV-Y"/>
                <xs:enumeration value="TV-Y7"/>
                <xs:enumeration value="TV-G"/>
                <xs:enumeration value="G"/>
                <xs:enumeration value="TV-PG"/>
                <xs:enumeration value="PG"/>
                <xs:enumeration value="PG-13"/>
                <xs:enumeration value="TV-14"/>
                <xs:enumeration value="TV-MA"/>
                <xs:enumeration value="R"/>
                <xs:enumeration value="NC-17"/>
                <xs:enumeration value="Adult"/>
            </xs:restriction>
        </xs:simpleType>
    </xs:element>
    <xs:element name="contentCategory">
        <xs:simpleType>
            <xs:restriction base="xs:string">
                <xs:enumeration value="Adult Situation"/>
                <xs:enumeration value="Brief Nudity"/>
                <xs:enumeration value="Sexual Situations"/>
                <xs:enumeration value="Rape"/>
                <xs:enumeration value="Nudify"/>
                <xs:enumeration value="Strong Sexual"/>
                <xs:enumeration value="Language"/>
                <xs:enumeration value="Strong Language"/>
                <xs:enumeration value="Graphic Language"/>
                <xs:enumeration value="Explicit Language"/>
                <xs:enumeration value="Fantasy Violence"/>
                <xs:enumeration value="Mild Violence"/>
                <xs:enumeration value="Violence"/>
                <xs:enumeration value="Graphic Violence"/>
            </xs:restriction>
        </xs:simpleType>
    </xs:element>
    <xs:element name="parentalControlCategory">
        <xs:complexType>
            <xs:sequence>
                <xs:element ref="contentCategory" maxOccurs="14"/>
            </xs:sequence>
        </xs:complexType>
    </xs:element>
</xs:schema>
```

Program Detail Schemas

Program Detail Schema - protected

```
<?xml version="1.0" encoding="utf-8"?>
<xs:schema xmlns:xs="http://www.w3.org/2001/XMLSchema"
xmlns:wmh="http://www.wmhelp.com/2003/eGenerator"
elementFormDefault="qualified">
    <xs:element name="moverContent">
        <xs:element name="moverProtocolVersion" type="xs:string"/>
        <xs:complexType>
          <xs:element name="protectionType" type="xs:string"/>
          <xs:element name=" protectedMetadata" type="xs:base64Binary"/>
        </xs:complexType>
    </xs:element>
</xs:schema>
```

Program Detail Schema - clear

```
<?xml version="1.0" encoding="utf-8"?>
<xs:schema xmlns:xs="http://www.w3.org/2001/XMLSchema"
xmlns:wmh="http://www.wmhelp.com/2003/eGenerator"
elementFormDefault="qualified">
    <xs:element name="moverContent">
        <xs:element name="moverProtocolVersion" type="xs:string"/>
        <xs:complexType>
          <xs:element ref="program"/>
        </xs:complexType>
    </xs:element>
    <xs:element name="program">
        <xs:complexType>
            <xs:attribute name="channel" type="xs:string" use="required"/>
            <xs:attribute name="channelName" type="xs:string"
            use="required"/>
            <xs:attribute name="program-id" type="xs:string"
            use="required"/>
            <xs:attribute name="showType" type="xs:string" use="required"/>
            <xs:attribute name="start" type="xs:string" use="required"/>
            <xs:attribute name="stop" type="xs:string" use="required"/>
            <xs:attribute name="closeCaptioned" type="xs:string"
            use="required"/>
            <xs:element ref="seriesName"/>
            <xs:element ref="desc"/>
            <xs:element ref="credits"/>
            <xs:element ref="audio"/>
            <xs:element ref="episode-num"/>
        </xs:complexType>
    </xs:element>
    <xs:element name="seriesName">
        <xs:complexType>
            <xs:simpleContent>
                <xs:extension base="xs:string">
                    <xs:attribute name="lang" type="xs:string" use="required"/>
                </xs:extension>
            </xs:simpleContent>
        </xs:complexType>
    </xs:element>
    <xs:element name="desc">
        <xs:complexType>
            <xs:simpleContent>
                <xs:extension base="xs:string">
                    <xs:attribute name="lang" type="xs:string" use="required"/>
                </xs:extension>
            </xs:simpleContent>
        </xs:complexType>
    </xs:element>
    <xs:element name="credits">
        <xs:complexType>
            <xs:sequence>
                <xs:element ref="actor"/>
                <xs:element ref="director"/>
                <xs:element ref="producer"/>
            </xs:sequence>
        </xs:complexType>
    </xs:element>
```

Program Detail Schema - clear (continued)

```
<xs:element name="actor" type="xs:string"/>
<xs:element name="director" type="xs:string"/>
<xs:element name="producer" type="xs:string"/>
<xs:element name="audio">
    <xs:complexType>
        <xs:attribute name="present" type="xs:string" use="required"/>
        <xs:attribute name="stereo" type="xs:string" use="required"/>
    </xs:complexType>
</xs:element>
<xs:element name="episode-num">
    <xs:complexType>
        <xs:simpleContent>
            <xs:extension base="xs:string">
                <xs:attribute name="system" type="xs:string"
                use="required"/>
            </xs:extension>
        </xs:simpleContent>
    </xs:complexType>
</xs:element>
</xs:schema>
```

Device Registration Schema

Device Registration Schema

```
<?xml version="1.0" encoding="utf-8"?>
<xs:schema xmlns:xs="http://www.w3.org/2001/XMLSchema"
xmlns:wmh="http://www.wmhelp.com/2003/eGenerator"
elementFormDefault="qualified">
    <xs:element name="clientDevice">
        <xs:complexType>
            <xs:element name="deviceID" type="xs:base64Binary"
            use="required"/>
            <xs:element name="deviceName" type="xs:string"/>
            <xs:element name="deviceType">
                <xs:simpleType>
                    <xs:restriction base="xs:string">
                        <xs:restriction value="type 1"/>
                        <xs:restriction value="type 2"/>
                    </xs:restriction>
                </xs:simpleType>
            </xs:element>
            <xs:element ref="protectionType"/>
        </xs:complexType>
    </xs:element>
</xs:schema>
```

Content Control Profile Schemas

Content Control Profile Schema - protected

```
<?xml version="1.0" encoding="utf-8"?>
<xs:schema xmlns:xs="http://www.w3.org/2001/XMLSchema"
xmlns:wmh="http://www.wmhelp.com/2003/eGenerator"
elementFormDefault="qualified">
    <xs:element name="contentControlProfile">
        <xs:element name="moverProtocolVersion" type="xs:string"/>
        <xs:element name="sequenceNumber" type="xs:string"/>
        <xs:element name="profileProtectionType" type="xs:string"/>
        <xs:element name="profileData" type="xs:base64Binary"/>
    </xs:element>
</xs:schema>
```

Status Update Schema - clear

```
<?xml version="1.0" encoding="utf-8"?>
<xs:schema xmlns:xs="http://www.w3.org/2001/XMLSchema"
xmlns:wmh="http://www.wmhelp.com/2003/eGenerator"
elementFormDefault="qualified">
    <xs:element name="contentControlProfile">
        <xs:element name="moverProtocolVersion" type="xs:string"/>
        <xs:element name="sequenceNumber" type="xs:string"/>
        <xs:complexType>
           <xs:sequence>
              <xs:element name="PIN" type="xs:string"/>
              <xs:element ref="contentBlocking"/>
           </xs:sequence>
        </xs:complexType>
    </xs:element>
    <xs :element name="contentBlocking">
        <xs:complexType>
           <xs:sequence>
              <xs:element ref="rating"/>
              <xs:element ref="parentalControlCategory"/>
              <xs:element ref="channelBlock"/>
           </xs:sequence>
        </xs:complexType>
    </xs:element>
    <xs:element name="channelBlock">
        <xs:complexType>
           <xs:sequence>
              <xs:element name="channel" type="xs:string"
                maxOccurs="unbounded"/>
           </xs:sequence>
        </xs:complexType>
    </element>
</xs:schema>
```

Class Index

The following class list includes classes, structures, unions, and interfaces with brief descriptions:

<ContentDownloadProtocol> (Protocol for the download UI to monitor progress)

ContentProgram (This class contains the basic information and methods of an individual program)

Domain (The Domain object manages the connection to the DRM Domain and discovers the Remote Content Sources)

DownloadQueue (Download queue tracks list of requested downloads)

DownloadQueueEntry (An individual entry in the download queue)

LocalContentSource (This class manages the local content that has already been downloaded)

MediaPlayer (This singleton allows content programs to be played, one at a time)

ProgramDetailInfo (This class contains detailed information about an individual program)

ProgramInfo (This class contains information about an individual program)

RemoteContentSource (This class manages the content retrieved from a given content source)

Class Documentation

<ContentDownloadProtocol> Protocol Reference

Protocol for the download UI to monitor progress.

import <DownloadQueue.h>

Public Member Functions (void)—ContentDownloadQueueChanged

Report when an item is added or removed from the queue.

(void)—ContentDownloadNotAllowed

Report when an item was NOT added to the queue due to registration error.

(void)—ContentDownloadStarted:

Report next download in queue has started.

(void)—ContentDownloadProgress:withTotalSize:

Report download progress.

(void)—ContentDownloadFinished:

Reports when a download is completed, and the content is locally playable.

(void)—ContentDownloadError:on Download:

Report an error in the download.

Detailed Description: Protocol for the download UI to monitor progress. Uses: This delegate protocol allows the UI to know when a download starts and ends, and how it is progressing. It is expected to be used to show a progress bar, and report errors.

Member Function Documentation (void) ContentDownloadError: (NSError *) error on Download: (int) downloadIndex Report an error in the download. Uses: On a download error, the download is considered paused. The UI can then retry by resuming it, or resume the next one on the list.

(void) ContentDownloadFinished: (ContentProgram *) programDownloaded

Reports when a download is completed, and the content is locally playable. Uses: When this function is called, the program passed is no longer in the queue. The first unpaused item in the queue will start downloading shortly after this function returns, unless the UI starts a different one first.

(void) ContentDownloadNotAllowed

Report when an item was NOT added to the queue due to registration error. Uses: This call back is triggered when the item does NOT have a proper license to allow the content to be downloaded.

(void) ContentDownloadProgress: (unsigned long long) currentSize withTotalSize: (unsigned long long) totalSize Report download progress. Uses: This update is designed to be used to update a progress bar and progress text. The actual byte counts are provided for flexibility. Note: Most UI's should not redraw every time this is called. Only drawing on 1 out of 10 is often smooth enough.

(void) ContentDownloadQueueChanged

Report when an item is added or removed from the queue. Uses: This callback is triggered when an item is added or removed by any action other than a successful download.

(void) ContentDownloadStarted: (int) downloadIndex

Report next download in queue has started. Uses: This allows UI to update as the next download starts. Note that due to pauses or errors, the item downloading might not be the one at the top of the queue.

ContentProgram Class Reference

This class contains the basic information and methods of an individual program.

import <ContentProgram.h>

Public Member Functions (void)—downloadDetailInfo:withSelector:

Requests download of detail information. This call is async, since it is a separate call.

(void)—addToDownloadQueue

Download the ContentProgram.

(NSError *)—topOfXQueue

Move the selected program to the top of the transcoding queue.

Protected Attributes

ProgramStatus _status

ProgramInfo * _pInfo

RemoteContentSource * _rcSource id detailTarget
SEL detailSelector
Properties
ProgramStatus status
Status string is translated into simple enum. Local Programs is also checked.
ProgramInfo * pInfo
Returns program info already returned by the directory call.
RemoteContentSource * rcSource
A reference to the source this program came from.

Detailed Description: This class contains the basic information and methods of an individual program. Basic information for a program includes: A status which determines if the program has been downloaded, or is allowed to be downloaded. Program information for essentials like channel and name A reference to which Remote Content Source the program is stored on.

Member Function Documentation
(void) addToDownloadQueue
Download the ContentProgram. This method will place the current program in the download queue. See also: DownloadQueue
(void) downloadDetailInfo: (id) target withSelector: (SEL) selector
Requests download of detail information. This call is async, since it is a separate call. The metadata will include a program description and credits.
Parameters:

| | |
|---|---|
| target | The object to be notified when the metadata has been retrieved. |
| selector | The selector for the method to be called. The method must take a ProgramDetailInfo object as an argument. For example: - (void) receiveDetailInfo: (ProgramDetailInfo *) metadata; |

(NSError *) topOfXQueue
Move the selected program to the top of the transcoding queue. This method will return an error if the program has already been transcoded. If successful, the RemoteContentSource will send a RemoteContentUpdate notification to notify that the program list has changed, since the selected program will now be higher on the list.
Property Documentation
(ProgramInfo*) pInfo [read, write, retain]
Returns program info already returned by the directory call. Includes channel number and name, program name and showtime, and rating.
(RemoteContentSource*) rcSource [read, write, assign]
A reference to the source this program came from. Can be used to determine which Remote Content Source has this program. See also: RemoteContentSource
(ProgramStatus) status [read, write, assign]
Status string is translated into simple enum. Local Programs is also checked. Uses: To determine if program has already been downloaded. See also: ProgramStatus
Domain Class Reference
The Domain object manages the connection to the DRM Domain and discovers the Remote Content Sources.
import <Domain.h>
Public Member Functions
(bool)—searchDomainController
Setup the runtime for the domain object and search the domain controller.
(DomainOperationMode)—getDomainOperationMode
The operation mode shows if remote playback is allowed, or only local, or none.
(DomainControllerStatus)—getDomainControllerStatus
Check whether the identified domain controller is new or old.
(bool)—join:
Join the DRM domain.
(bool)—leave
Leave the DRM domain.
(bool)—disassociate
Disassociate with the DRM domain.
(NSArray *)—getRCSHostnames
Get an Array of RemoteContentSource hostnames.
(void)—nameResolutionComplete:returnStatus:
(void)—nameResolutionEnondirError:userError:
(void)—CertificateDownloaderSuccess:initflag:
(void)—updateReceived:withDictionary:
(BOOL)—is OnWiFi
(void)—downloadCertificatesFromMover:
Protected Attributes
BonJour * bjAgent
NSArray * _RCSHostnames
NSString * _IPRM_Home
NSString * _clientDeviceID
NSString * _domainControllerName
NSString * _domainControllerRealm
NSString * _moverServicePortNumber
DomainOperationMode operationMode
DomainControllerStatus dcStatus
IPRM_Interface * iprmIF
int seqNumber
Properties
NSString * domainID
The ID for the DRM Domain.
NSArray * RCSHostnames
The array of RCS Hostnames.
NSString * clientDeviceID
The unique device ID of this client.
NSString * domainControllerName
The domain controller name.
NSString * domainControllerRealm
The domain controller realm.
NSString * moverServicePortNumber
Port number used by the movers.
RemoteContentSource * res Detailed Description: The Domain object manages the connection to the DRM Domain and discovers the Remote Content Sources. The program using this class must first setup the Runtime Env with the Unique Device ID. It will then join the domain, which will make the hostnames of the Remote Content Sources available.
Member Function Documentation
(bool) disassociate
Disassociate with the DRM domain. Uses: The device will disassociate itself with the registered DRM domain, and will be free to join another one.
Returns: Returns false, if the client failed to clear registration. Returns true, if the client has disassociated with the domain.
(DomainControllerStatus) getDomainControllerStatus
Check whether the identified domain controller is new or old. Uses: An old controller is one with which a device is registered. Otherwise, it's a new controller.
(DomainOperationMode) getDomainOperationMode
The operation mode shows if remote playback is allowed, or only local, or none. Uses: This value is determined by the rules of the DRM domain. It allows the UI to know the restrictions in effect without trying to play content first.

(NSArray *) getRCSHostnames

Get an Array of RemoteContentSource hostnames. Uses: This array is filled with the hostnames of the devices that provide Remote Content. Each name can be used to connect to the source by initializing a RemoteContentSource object. See also: RemoteContentSource (bool) join: (NSString *) deviceID Join the DRM domain. Uses: Joining the DRM domain sends the unique device ID to the domain controller and registers the device.

Returns: Returns false, if the client failed to initialize DRM and join a domain. If true is returned, then an attempt to register with the domain is in progress. Note that IPRM_init checks for certificates so it must be called after IPRM certs are downloaded or they're known to exist.

(bool) leave

Leave the DRM domain. Uses: The device will leave the DRM domain, and no longer be able to use it's services for playback. Returns: Returns false, if the client failed to contact the domain controller or the client leaves a domain controller it has not joined.

(bool) searchDomainController

Setup the runtime for the domain object and search the domain controller. Uses: This searches the domain controller. If found, the app can proceed to join the domain. NOTE: this method will cause notifications to be sent based on mDNS discovered ContentSources. It will send an error notification in case the domain controller cannot be found.

Property Documentation (NSString*) moverServicePortNumber [read, write, retain]

Port number used by the movers. Uses: When the RCS is a mover, it will use a specific port, as discovered by Bonjour. This port number will be used to get content from the mover.

(NSArray*) RCSHostnames [read, write, retain]

The array of RCS Hostnames. Uses: Each member of the array is a hostname that can be used to connect to the Remote Content Source. See also: RemoteContentSource DownloadQueue Class Reference Download queue tracks list of requested downloads.
import <DownloadQueue.h>
Public Member Functions
(NSError *)—addProgramToQueue:forRCS:
Add a ContentProgram to the end of the queue.
(NSArray *)—getProgramsInQueue
Returns array of ContentPrograms which are currently in download queue.
(DownloadQueueEntry *)—getDownloadEntryByContentID:
Returns downloadEntry for a given ContentID.
(DownloadQueueEntry *)—getDownloadEntryAtIndex:
Returns downloadEntry at given index. Includes ContentProgram, rcsID, and current download progress.
(int)—currentDownloadIndex
(long long)—getCurrentBytes:
Returns bytes downloaded at given index.
(void)—pauseCurrentDownload
Pauses the current download.
(NSError *)—resumeDownload:
(void)—moveDownloadProgram:toIndex:
(void)—deleteDownloadProgram:
(void)—saveQueue
(void)—checkQueueForNextDownload
(void)—startNextDownload
(void)—startDownloadAtIndex:
(void)—iprmEstablishSessionFor:
(void)—proceedWithCurrentDownload
(BOOL)—IsSpaceAvailableForDownloads:
(void)—moveToDownloadQueue:

Static Public Member Functions
(DownloadQueue *)+getDownloadQueue
Returns singleton.
Protected Attributes
id<ContentDownloadProtocol>_delegate
NSMutableArray * downloadArray
NSMutableArray * waitingArray
BOOL is LicenseAcquiredForCurrentDownload
BOOL is DownLoadOnGoing
BOOL is LicenseAcqOnGoing
NSOperationQueue * downloadOpQueue
NSlnvocationOperation * currentdoper
URLDownloader * contentDownloader
Reachability * wifiReach
Reachability * rcsReach
Properties
id<ContentDownloadProtocol> delegate
The delegate is the object which will receive updates from the queue.
int cunentDownloadIndex
Holds the index of the currently downloading program, or NSNotFound if none.

Detailed Description: Download queue tracks list of requested downloads. Downloads will progress through the queue automatically, unless modified by the methods below. Methods are available to allow the UI to add, move or delete items from the queue, as well as to get enough information to provide good visual feedback about the contents of the queue. Restart Notes: Any downloads in queue when app is shutdown will restart automatically when DownloadQueue is first instantiated with getDownloadQueue. Downloads will also restart automatically if WiFi is lost and restored, for example if the user walks out of range.

Member Function Documentation (NSError *) addProgramToQueue: (ContentProgram *) program forRCS: (NSString *) rcsID Add a ContentProgram to the end of the queue. Uses: Add a ContentProgram from a RemoteContentSource to the queue. This will also update the ContentProgram's status, so the UI might need to update.

(int) currentDownloadIndex

Returns index of program currently downloading. This index could be out of date if any download started since getProgramsInQueue was last called.

(void) deleteDownloadProgram: (int) index

Deletes a program from the queue. Remember that this will change existing indexes. Most UI programs should call getProgramsInQueue after this.

(void) moveDownloadProgram: (int) fromIndex toIndex: (int) toIndex

Moves a program to another place in the queue. This is designed to work like moveRowAtIndexPath in UITableViewDataSource.

(NSError *) resumeDownload: (int) downloadIndex

Resume download at given index. Can also be called on programs in queue that have not started downloading yet will return error if another download is in progress, or if the WiFi connection is not available.

(void) saveQueue
Saves state of current downloads Must be called when app is exiting in order for current download to properly restart.
Property Documentation
(id<ContentDownloadProtocol>) delegate [read, write, assign]
The delegate is the object which will receive updates from the queue. Uses: It is expected that a UIViewController which controls the view that shows download progress will be used for the delegate. Note that completed downloads are also announced as notifications by the LocalContentSource. See also: LocalContentSource
DownloadOueueEntry Class Reference
An individual entry in the download queue.
import <DownloadQueueEntry.h>
Protected Attributes
ContentProgram * _programToDownload
NSString * _rcsID
long long _bytesDownloaded
Properties
ContentProgram * programToDownload
NSString * rcsID
long long bytesDownloaded
Detailed Description: An individual entry in the download queue. This object can is used in the array returned by the DownloadQueue. Note that the download progress can be viewed at any time by using the bytesDownloaded property, and the total bytes are part of the ContentProgram.
LocalContentSource Class Reference
This class manages the local content that has already been downloaded.
import <LocalContentSource.h>
Public Member Functions
(NSArray *)—getContentArray
Returns an array of ContentPrograms.
(ContentProgram *)—getProgramWithID:
Get a specific content Program, to play back easily. Note that it could be nil if the program has been deleted.
(BOOL)—deleteLocalProgram:
Deletes Program from local content source.
(NSError *)—updateProgram:
(void)—persistDataToDisk
(BOOL)—privateDeleteProgram
Static Public Member Functions
(LocalContentSource *)+getLocalContentSource
Returns the singleton for local content source.
Protected Attributes
NSMutableArray * _contentArray
Detailed Description: This class manages the local content that has already been downloaded. The content can be read as an array, or a specific program can be retrieved by programID. A notification is sent any time new contents are downloaded.
Member Function Documentation
(BOOL) deleteLocalProgram: (ContentProgram *) contentProgram
Deletes Program from local content source. Uses: Deletes a local program.
Parameters:

| | |
|---|---|
| contentProgram | The program to be deleted. |

Returns: YES if program was locally available, and file was deleted.
Returns: NO if the program was not locally available.

(NSArray *) getContentArray
Returns an array of ContentPrograms. Uses: This array lists all the programs that have been downloaded. It will normally match the list that would be built from all RemoteContentSources by checking to see which are currently downloaded. The only difference is that programs here will be available even if an RCS is not available.
MediaPlayer Class Reference
This singleton allows content programs to be played, one at a time.
import <MediaPlayer.h>
Public Member Functions
(NSError *)—prepareToPlay:
Prepares the D2G-SDK to play the given program.
(id)—getMoviePlayer:
Returns an MPMoviePlayer object.
(void)—releaseMoviePlayer:
Releases the object returned from getMoviePlayer.
Static Public Member Functions
(MediaPlayer *)+getMediaPlayer
Returns the singleton wrapper object.
Protected Attributes
id moviePlayer
CustomHTTPServer * cHTTPServer
NSURL * movieUrl
Detailed Description: This singleton allows content programs to be played, one at a time. The UI using this class will use prepareToPlay to decide which program to play, and getMoviePlayer to retrieve the correct MoviePlayer object. The returned object can then play the movie as described by the iOS SDK. Once the UI is finished, it should call releaseMoviePlayer. NOTE: releasing the MoviePlayer directly is not supported.
Member Function Documentation
(id) getMoviePlayer: (MoviePlayerType) type
Returns an MPMoviePlayer object. Uses: The object returned is fully initialized, and ready to play. NOTE: changing the configuration of the object returned is NOT supported.
Parameters:

| | |
|---|---|
| type | MPTypeController returns an MPMoviePlayerController. See Apples docs for behavior under different versions. MPTypeViewController returnsan MPMoviePlayerViewController. Only supported for iOS version >= 3.2. |

Returns: Returns the appropriate object, or nil if that object is unavailable. NOTE: repeated calls will return the identical object. This object will be valid until releaseMoviePlayer is called. Uses: The object returned is fully initialized, and ready to play. NOTE: changing the configuration of the object returned is NOT supported.
Parameters:

| | |
|---|---|
| type | MPTypeController returns an MPMoviePlayerController. See Apples docs for behavior under different versions. MPTypeViewController returns an MPMoviePlayerViewController. Only supported for iOS version >= 3.2. |

Returns: Returns the appropriate object, or nil if that object is unavailable. NOTE: repeated calls will return the identical object. This object will be valid until releaseMoviePlayer is called.

(NSError *) prepareToPlay: (ContentProgram *) program
Prepares the D2G-SDK to play the given program. Uses: This method must be called before the movie is played. It can also be called after a movie is played to play a different movie.
Parameters:

| program | A ContentProgram returned from either LocalContentSource, or RemoteContentSource. |

Returns: nil if there's no error, otherwise an NSError* with error code from D2GErrors.h. Uses: This method must be called before the movie is played. It can also be called after a movie is played to play a different movie.
Parameters:

| program | A ContentProgram returned from either LocalContentSource, or RemoteContentSource. |

Returns: BOOL YES if the program can be played. NO if there was an error.

ProgramDetailInfo Class Reference

This class contains detailed information about an individual program.
    #import <ProgramDetailInfo.h>
    Protected Attributes
    BOOL _is ClosedCaptioningAvailable
    NSString * _detailDescription
    NSMutableArray * _credits
    NSMutableDictionary * _audio
    NS String * _episodeNum
    NSString * _seriesName
    Properties
    BOOL is ClosedCaptioningAvailable
    String describing the availability of closed captioning.
    NSString * detailDescription
    Program long description as an string.
    NSString * episodeNum
    Episode number for a program that is part of a series.
    NSString * seriesName
    Series Namer of a program.
    NSMutableArray * credits
    Credits for this program.
    NSMutableDictionary * audio
    Audio flags to show what audio features are available.
    Detailed Description: This class contains detailed information about an individual program. Detailed information for a program includes: A full description of the program. Detailed credits for the program. Flags to determine availability of closed captioning and types of audio.
    Property Documentation
    (NSMutableDictionary*) audio [read, write, retain]
    Audio flags to show what audio features are available. Uses: The audio flags are keys for audio features such as "stereo", with values to show if available. If the feature is not available, the key might not have a value, or a value of "no".
    (NSMutableArray*) credits [read, write, retain]
    Credits for this program. Uses: credits are provided in an NSArray where each element is an NSDictionary. The contents of the credits will vary with the program.
    (NSString*) detailDescription [read, write, copy]
    Program long description as an string. Uses: Free form string to be displayed when the UI asks for detailed information. Could be nil if not available for a particular program.
    (BOOL) is ClosedCaptioningAvailable [read, write, assign]
    String describing the availability of closed captioning. Uses: String should be "yes" if closed captioning is available. Could be nil if no information is available.

ProgramInfo Class Reference

This class contains information about an individual program.
    #import <ProgramInfo.h>
    Protected Attributes
    NSString * _channel
    NSString * _channelName
    NSString * _programID
    NSString * _status
    ShowType _type
    NSString * _starttime
    NSString * _endtime
    NSString * _seriesName
    NSString * _programName
    NSArray * _icons
    NSString * _rating
    UsageAllowed _allowed
    NSArray * parentalControlCategory
    NSString * _contentURL
    NSString * _contentID
    unsigned long long _contentSize
    NSArray * _offsets
    NSString * _filePathOnDisk
    ProtectionType _protection
    Properties
    NSString * channel
    NSString * channelName
    NSString * programID
    Unique program ID for a given content source.
    NSString * status
    Raw status from the content Source.
    ShowType type
    Show type indicates if program is part of a series.
    NSString * starttime
    NSString * endtime
    NSString * seriesName
    NSString * programName
    NSArray * icons
    An array of icon information.
    NSString * rating
    UsageAllowed allowed
    The usage allowed for this program.
    NSString * description
    NSArray * parentalControlCategory
    ProtectionType protection
    NSString * contentURL
    NSString * contentID
    unsigned long long contentSize
    NSString * filePathOnDisk
    NSArray * offsets
    Detailed Description: This class contains information about an individual program. Program info includes channel, series, and program names, and time information.

Property Documentation
(UsageAllowed) allowed [read, write, assign]
The usage allowed for this program. Uses: The UI should use this field to restrict how the program is used, otherwise it will be enforced in the DRM system. See also: UsageAllowed
(NSArray*) icons [read, write, retain]
An array of icon information. Uses: The icon array is composed of NSDictionaries that include the URL of each icon, and size information to help decide which icon to use for a given display. The NSDictionary will contain objects for the following keys:
height: An NSNumber with the height of the icon in pixels;
width: An NSNumber with the width in pixels;
src: An NSString with the URL used to download the icon image;
type: An NSNumber with the ShowType enumeration stored as an int.
See also: ShowType
(NSString*) programID [read, write, retain]
Unique program ID for a given content source. Uses: Can be used to later identify this unique program. See also: RemoteContentSource
(NSString*) status [read, write, copy]
Raw status from the content Source. Uses: used to derive the overall download status of the program. See also: ContentProgram
(ShowType) type [read, write, assign]
Show type indicates if program is part of a series. Uses: This is used to know if the program is part of a series, or a standalone program, like a movie.
RemoteContentSource Class Reference
This class manages the content retrieved from a given content source.
import <RemoteContentSource.h>
Public Member Functions
(id)—initWithRCSID:in Domain:
Init with RCS ID from Domain.
(void)—directory
Force directory of remote content to be read.
(NSArray *)—getContentArray
Returns an array of ContentPrograms.
(ContentProgram *)—getProgramWithID:
Get a specific content Program by programID.
(void)—postDirCompleteNotification
(void)—parseProgramDetailXMLFileWithURLString: programType:
(NSString *)—getProgramDetailURLWithId:
Protected Attributes
NSString * _rcsID
NSMutableArray * _contentArray
Properties
NSString * rcsID
The ID of the content source this object is reading from.
Detailed Description: This class manages the content retrieved from a given content source. The content can be read as an array, or a specific program can be retrieved by programID The contents are read on a directory call. A notification is sent any time new contents are read.
Member Function Documentation
(void) directory
Force directory of remote content to be read. Uses: Must be called once after initialization, and any time the UI wants an on demand update. A kRemoteContentUpdate will be sent only if new contents are found.

(NSArray *) getContentArray
Returns an array of ContentPrograms. Only valid after the first notification. Might be nil before then. Any copies or other derived information must be updated when new notification arrives. See also:
ContentProgram
(ContentProgram *) getProgramWithID: (NSString *) programID
Get a specific content Program by programID Uses: Allows the UI to remember a specific program. Not guaranteed to be available if content is no longer on the RCS. Also not valid before first notification, as directory has not been read yet. See also: ContentProgram
(id) initWithRCSID: (NSString *) rcsID in Domain: (Domain *) rcsDomain
Init with RCS ID from Domain. Uses: Designed to be called when Home Domain sends a notification that a content source is found.
Parameters:

| rcsID | from Home Domain. |
| --- | --- |

Returns: A new instance. Note that getContentArray does not return contents until the first kRemoteContentUpdate Nofification is sent. See also: getContentArray
Property Documentation
(NSString*) rcsID [read, assign]
The ID of the content source this object is reading from. Uses: When downloading content, the rcsID must be passed to the DownloadQueue.
Defines
define kDomainControllerFound @"DomainControllerFound"
define kRegisteredToDomain @"RegisteredToDomain"
define kDomainRegistrationError @"DomainRegistrationError"
define kRemoteContentUpdate @"RemoteContentUpdate"
Notification sent for both initial read of remote content, and when content updates.
define kMoverLocalContentUpdate @"MoverLocalContentUpdate"
Notification sent for both initial read of local content, and when content updates.
Typedefs
typedef enum _ProgramStatus ProgramStatus
Enumerations
enum ProgramStatus {RCProgramStatusReady, RCProgramStatusDownloading, RCProgramStatusPausedDownloading, RCProgramStatusLocal, RCProgramStatusPending, RCProgramStatusInProgress, RCProgramStatusNotAvailable}
Detailed Description
Define Documentation
define kDomainControllerFound @"DomainControllerFound"
Defines for Notifications Domain Notifications
define kRemoteContentUpdate @"RemoteContentUpdate"
Notification sent for both initial read of remote content, and when content updates. userinfo will contain pointer to NSError if remote connection fails.
Defines
define kSDKErrorDomain @"DVR2GOError"
DVR2GO errors will be associated with their own domain.

define kAlreadyDownloadedCode 1
A downloaded program can't be download again while it is locally stored.
define kNoWiFiConnectionCode 2
Network operations will fail if WiFi is not available.
define kDownloadlnProgress 3
A download can't be resumed if there's already one in progress.
define kNotEnoughSpace 4
Not enough space to download the program.
define kRegistrationError 5
Unable to register for licensed content.
define kProximityError 6
Content source must be within range to achieve 7 ms latency over WiFi.
define kCorruptVideoError 7
Downloaded video is corrupt, and can't be played. NOTE that this video will be removed from the download queue.
define kProgramIDNotFoundError 8
Program ID not found in Remote Content Source. Usually indicates stale data being kept.
define kTranscodingPriorityNotChangedError 9
Transcoding priority could not be changed.
define kContentNotSupported 10
Content is not supported by this device, so it can't be played or downloaded.
Detailed Description
import <Foundation/Foundation.h>
Classes
class ProgramInfo
This class contains information about an individual program. Typedefs:
typedef enum _ShowType ShowType
typedef enum _UsageAllowed UsageAllowed
typedef enum _ProtectionType ProtectionType
Enumerations:
enum _ShowType {ShowTypeSeries, ShowTypeProgram}
enum _UsageAllowed {UsageAllowedStream, UsageAllowedCopy, UsageAllowedMove}
enum _ProtectionType {ProtectionTypeNone, ProtectionTypeIPRM, ProtectionTypeOther}
Typedef Documentation
typedef enum _ProtectionType ProtectionType
ProtectionType specifies which type of DRM protection content has. ProtectionTypeNone specifies clear content with no protection ProtectionTypeIPRM uses Motorola's IRPM ProtectionTypeOther uses an unsupported DRM. The D2G-SDK will not play these if they appear.
typedef enum _ShowType ShowType
A program will always be one or the other. An given program can have multiple icons for either the series as a whole, or the individual program. See also: icons
typedef enum _UsageAllowed UsageAllowed
UsageAllowed shows what actions a program's license allows.
UsageAllowedStream only allows it to be played remotely.
UsageAllowedCopy allows it to be downloaded or played remotely.
UsageAllowedMove allows it to be played remotely, but it will be deleted from the source if it is downloaded.
Enumeration Type Documentation
enum _ProtectionType
ProtectionType specifies which type of DRM protection content has. ProtectionTypeNone specifies clear content with no protection ProtectionTypeIPRM uses Motorola's IRPM ProtectionTypeOther uses an unsupported DRM. The D2G-SDK will not play these if they appear.
enum _ShowType
A program will always be one or the other. An given program can have multiple icons for either the series as a whole, or the individual program. See also: icons
enum _UsageAllowed
UsageAllowed shows what actions a program's license allows.
UsageAllowedStream only allows it to be played remotely.
UsageAllowedCopy allows it to be downloaded or played remotely.
UsageAllowedMove allows it to be played remotely, but it will be deleted from the source if it is downloaded.

Although embodiments of an object model for domain-based content mobility have been described in language specific to features and/or methods, the subject of the appended claims is not necessarily limited to the specific features or methods described. Rather, the specific features and methods are disclosed as example implementations of an object model for domain-based content mobility.

The invention claimed is:

1. A client device, comprising:
a media player configured to control playback of media content on the client device;
a memory and processor system comprising a client object model architecture configured for:
implementation of a proxy application configured to instantiate the media player on the client device, and interface with a media server that is configured to communicate the media content to the client device;
domain discovery of the media server;
domain-based registration of the client device with the media server;
authentication of the client device to the media server;
domain control for secure download of the media content from the media server to the client device;
digital rights management of the secure download of the media content to the client device; and
acquisition of a media content list and metadata that corresponds to the media content.

2. The client device as recited in claim 1, wherein the client object model architecture is further configured for:
transcoding the media content for download to the client device;
content streaming of the media content to the client device;
download queue management of the media content that is queued for download to the client device; and
playback of the media content on the client device.

3. The client device as recited in claim 1, wherein the client object model architecture is a software development kit (SDK) configured for scalable and adaptive implementation to interface a mobile client device configured for wireless communication with the media server.

4. The client device as recited in claim 1, wherein the client object model architecture comprises a domain class that includes functionality to control:
the domain discovery of the media server;
the domain-based registration of the client device with the media server; and
the authentication of the client device to the media server.

5. The client device as recited in claim 1, wherein the client object model architecture comprises a remote content source class that represents the media server and includes functionality to interface with the media server.

6. The client device as recited in claim 1, wherein the client object model architecture comprises a local content source class that includes functionality to control the media content that is securely downloaded and maintained on the client device.

7. The client device as recited in claim 1, wherein the client object model architecture comprises a download queue class that includes functionality to manage the media content that is an entry in a download queue to be downloaded to the client device from the media server.

8. The client device as recited in claim 7, wherein the client object model architecture comprises a download queue entry class that includes functionality to manage the media content that is scheduled to download to the client device.

9. The client device as recited in claim 1, wherein the client object model architecture comprises a media player class that represents the media player instantiated by the proxy application, and includes functionality to control playback of at least one of recorded media content and streaming media content on the client device.

10. The client device as recited in claim 1, wherein the client object model architecture comprises a content program class that represents one of local recorded media content or remote streaming media content.

11. The client device as recited in claim 1, wherein the client object model architecture comprises a program detail information class that includes metadata corresponding to the media content.

12. The client device as recited in claim 1, wherein the client object model architecture comprises a program information class that includes information about an individual program.

13. A method, comprising:
discovering a domain having a media server that is configured to wirelessly communicate media content to a mobile client device for playback of the media content on the mobile client device;
registering the mobile client device in the domain;
authenticating the mobile client device to the media server in the domain;
controlling a secure download of the media content from the media server to the mobile client device;
managing digital rights of the secure download of the media content from the media server to the mobile client device; and
acquiring a media content list and metadata that corresponds to the media content.

14. The method as recited in claim 13, further comprising:
transcoding the media content for download to the mobile client device;
streaming content of the media content to the mobile client device;
managing a download queue of the media content that is queued for download to the mobile client device; and
playbacking of the media content on the client device.

15. The method as recited in claim 13, further comprising:
streaming the media content from the media server to the mobile client device, wherein the media content is encrypted for the secure download to the mobile client device and decrypted at the mobile client device for playback.

16. The method as recited in claim 13, further comprising:
implementing a domain controller of a domain class in a client object model architecture, the domain controller implemented to control:
the discovering of the domain having the media server;
the registering of the mobile client device in the domain; and
the authenticating of the mobile client device to the media server in the domain.

17. A domain system, comprising:
a mobile client device configured with a client object model architecture that controls:
domain discovery of a media server that is configured to communicate media content to the mobile client device;
domain-based registration of the mobile client device with the media server;
authentication of the mobile client device to the media server;
secure download of the media content from the media server to the mobile client device for playback of the media content on the mobile client device;
digital rights management of the secure download of the media content to the mobile client device; and
acquisition of a media content list and metadata that corresponds to the media content.

18. The domain system as recited in claim 17, wherein the client object model architecture further controls:
transcoding the media content for download to the mobile client device;
content streaming of the media content to the mobile client device;
download queue management of the media content that is queued for download to the mobile client device; and
playback of the media content on the mobile client device.

19. The domain system as recited in claim 17, wherein the client object model architecture is configured for scalable and adaptive implementation to interface the mobile client device with the media server for wireless, secure download of the media content to the mobile client device.

20. The domain system as recited in claim 17, wherein the client object model architecture comprises a domain class that includes functionality to control:
the domain discovery of the media server;
the domain-based registration of the mobile client device with the media server; and
the authentication of the mobile client device to the media server.

21. A client device, comprising:
a media player configured to control playback of media content on the client device;
a memory and processor system comprising a client object model architecture comprising a software stack implemented in the client device, configured for:
implementation of a proxy application configured to instantiate the media player on the client device, and interface with a media server that is configured to communicate the media content to the client device;
domain discovery of the media server;
domain-based registration of the client device with the media server;
authentication of the client device to the media server; and
domain control for secure download of the media content from the media server to the client device.

22. The client device as recited in claim 21, wherein the client object model architecture is a software development kit (SDK) configured for scalable and adaptive implementation to interface a mobile client device configured for wireless communication with the media server.

* * * * *